United States Patent
Marshall et al.

(10) Patent No.: US 11,601,307 B2
(45) Date of Patent: Mar. 7, 2023

(54) ESTIMATING ONE OR MORE CHARACTERISTICS OF A COMMUNICATIONS CHANNEL

(71) Applicant: u-blox AG, Thalwil (CH)

(72) Inventors: Christopher Marshall, Reigate (GB); Alessandro Pin, Udine (IT); Roberto Rinaldo, Udine (IT); Marco Driusso, Cambourne (GB); Alessandro Biason, Sgonico TS (IT)

(73) Assignee: u-BLOX AG, Thalwil (CH)

( * ) Notice: Subject to any disclaimer, the term of this patent is extended or adjusted under 35 U.S.C. 154(b) by 0 days.

(21) Appl. No.: 17/309,698

(22) PCT Filed: Dec. 17, 2018

(86) PCT No.: PCT/EP2018/085328
§ 371 (c)(1),
(2) Date: Jun. 15, 2021

(87) PCT Pub. No.: WO2020/125935
PCT Pub. Date: Jun. 25, 2020

(65) Prior Publication Data
US 2022/0078050 A1 Mar. 10, 2022

(51) Int. Cl.
*H04L 25/02* (2006.01)
(52) U.S. Cl.
CPC ........ *H04L 25/0224* (2013.01); *H04L 25/022* (2013.01); *H04L 25/025* (2013.01); *H04L 25/0208* (2013.01)
(58) Field of Classification Search
CPC ...................................................... G01S 1/00
See application file for complete search history.

(56) References Cited

U.S. PATENT DOCUMENTS

| | | | | |
|---|---|---|---|---|
| 1,919,035 | A | * | 7/1933 | Phelps .................. H04L 25/085 178/69 B |
| 3,038,029 | A | * | 6/1962 | Carbrey .................. H03M 5/00 341/94 |

(Continued)

FOREIGN PATENT DOCUMENTS

| CA | 1277381 C | * 12/1990 | .............. G06F 11/10 |
|---|---|---|---|
| CA | 1278062 C | * 12/1990 | .............. G06F 11/10 |

(Continued)

OTHER PUBLICATIONS

C. C. Chong, D. I. Laurenson, C. M. Tan, S. McLaughlin, M. A. Beach and A. R. Nix, "Joint detection-estimation of directional channel parameters using the 2-D frequency domain SAGE algorithm with serial interference cancellation," 2002 IEEE International Conference on Communications. (Year: 2002).*

(Continued)

*Primary Examiner* — Berhanu Tadese
(74) *Attorney, Agent, or Firm* — Finnegan, Henderson, Farabow, Garrett & Dunner LLP

(57) ABSTRACT

Disclosed are Methods and apparatuses for estimating one or more characteristics of the communications channel. The method comprises receiving a first wireless signal transmitted by a transmitter at a first set of frequencies in a first time slot; and receiving a second wireless signal transmitted by the transmitter at a second set of frequencies in a second time slot. The second set of frequencies partially overlaps with the first set of frequencies and the second time slot is different from the first time slot. The method further comprises jointly processing the first wireless signal and the second wireless signal to estimate the one or more characteristics of the communications channel. Corresponding apparatuses are configured to implement the methods.

21 Claims, 11 Drawing Sheets

(56) References Cited

U.S. PATENT DOCUMENTS

| | | | | |
|---|---|---|---|---|
| 8,208,587 B2* | 6/2012 | Chong | | G01S 3/043 |
| | | | | 455/296 |
| 8,565,798 B2* | 10/2013 | Parker | | H01Q 3/2611 |
| | | | | 455/114.2 |
| 9,942,078 B2* | 4/2018 | Azadet | | H04L 27/2675 |
| 11,290,084 B2* | 3/2022 | Nielsen | | H03H 9/6433 |
| 2012/0141734 A1* | 6/2012 | Lee | | G02B 5/0268 |
| | | | | 428/141 |
| 2022/0078050 A1* | 3/2022 | Marshall | | H04L 25/0224 |
| 2022/0200574 A1* | 6/2022 | Nielsen | | H03H 9/545 |

FOREIGN PATENT DOCUMENTS

| | | | | | |
|---|---|---|---|---|---|
| CA | 2503248 | A1 | * | 8/1998 | ............... H04B 1/69 |
| CN | 1309759 | A | * | 8/2001 | ......... G01B 9/02027 |
| CN | 1351705 | A | * | 5/2002 | ......... G01B 9/02027 |
| CN | 101868984 | A | * | 10/2010 | ............... H04R 5/04 |
| CN | 101902415 | A | * | 12/2010 | ......... H04L 25/0202 |
| CN | 101868984 | B | * | 11/2013 | ............... H04R 5/04 |
| CN | 103733555 | A | * | 4/2014 | ........... H04B 7/0626 |
| CN | 105939299 | A | * | 9/2016 | ......... H04L 25/0224 |
| CN | 105978833 | A | * | 9/2016 | |
| CN | 106713191 | A | * | 5/2017 | ............ H04B 17/309 |
| CN | 103733555 | B | * | 8/2017 | ........... H04B 7/0626 |
| CN | 107425895 | A | * | 12/2017 | ............ H04B 17/391 |
| CN | 107864105 | A | * | 3/2018 | |
| CN | 108494449 | A | * | 9/2018 | ........... H04B 7/0413 |
| CN | 108848044 | A | * | 11/2018 | ............ H04B 17/309 |
| CN | 105939299 | B | * | 3/2019 | ......... H04L 25/0224 |
| CN | 107425895 | B | * | 7/2020 | ............ H04B 17/391 |
| CN | 111601253 | A | * | 8/2020 | ......... H04L 25/0204 |
| CN | 106713191 | B | * | 9/2020 | ............ H04B 17/309 |
| CN | 112423265 | A | * | 2/2021 | ............ G06N 3/0445 |
| CN | 108494449 | B | * | 3/2021 | ........... H04B 7/0413 |
| CN | 111601253 | B | * | 8/2021 | ......... H04L 25/0204 |
| CN | 113438682 | A | * | 9/2021 | |
| CN | 113472705 | A | * | 10/2021 | |
| CN | 112423265 | B | * | 4/2022 | ............ G06N 3/0445 |
| EP | 1361715 | A1 | * | 11/2003 | ......... H04L 25/0202 |
| EP | 2257005 | A2 | * | 12/2010 | ......... H04L 25/0202 |
| EP | 2807777 | B1 | * | 1/2016 | ........... H04B 7/0413 |
| EP | 3 316 534 | A1 | | 5/2018 | |
| EP | 3316534 | A1 | * | 5/2018 | ......... H04L 25/0204 |
| JP | 4153161 | B2 | * | 9/2008 | ......... H04L 25/0204 |
| JP | 2010279037 | A | * | 12/2010 | ......... H04L 25/0202 |
| JP | 5680337 | B2 | * | 3/2015 | ......... H04L 25/0202 |
| TW | 200939711 | A | * | 9/2009 | ......... H04L 25/0226 |
| WO | WO-2009146444 | A1 | * | 12/2009 | ............ H03M 13/29 |
| WO | WO-2018160141 | A1 | * | 9/2018 | ............... G01S 3/74 |
| WO | WO-2018215973 | A1 | * | 11/2018 | ............ H03H 11/12 |
| WO | WO-2019138156 | A1 | * | 7/2019 | ............ H04B 17/318 |
| WO | WO-2020125935 | A1 | * | 6/2020 | ............ G01S 1/0428 |

OTHER PUBLICATIONS

Chong et al. Joint detection-estimation of directional channel parameters using the 2-D frequency domain SAGE algorithm with serial interference cancellation, IEEE 2002 (Year: 2002).*

International Search Report for corresponding application No. PCT/EP2018/085328, dated Sep. 3, 2019.

* cited by examiner

ESTIMATING ONE OR MORE CHARACTERISTICS OF A COMMUNICATIONS CHANNEL

RELATED APPLICATIONS

This application is a U.S. national stage entry under 35 U.S.C. § 371 from PCT. International Application No. PCT/EP2018/085328, filed Dec. 17, 2018, which is incorporated herein by reference.

FIELD OF THE INVENTION

This invention relates to methods and apparatus for estimating one or more characteristics of a communications channel. It relates in particular to the estimation of channel characteristics that may be useful for positioning and/or timing determinations, and to the use of those characteristics in such determinations.

BACKGROUND OF THE INVENTION

Positioning using Global Navigation Satellite Systems (GNSS), such as the Global Positioning System (GPS) is known. Traditionally, the calculation of position relies on trilateration, based on the time of arrival of signals from multiple different satellites. In the case of GPS, for example, satellite signals in the L1 band are conventionally used for the trilateration. The GPS satellites also transmit a signal on further frequencies including the L2 band, which in combination together with the L1 band signal are traditionally used for taking into account ionospheric error.

With all positioning systems, it would be desirable to increase the positioning accuracy. GNSS systems in particular also suffer from the problem of availability: there are many environments in which it is difficult or impossible to receive satellite signals reliably—especially in dense urban environments or indoors. It would therefore be desirable to develop a positioning system that offers greater coverage and can calculate position in circumstances when traditional GNSS positioning would fail or become unreliable.

In many environments—including environments where GNSS availability may be limited—a variety of other signals is available, which may be used to infer information about position. These include so-called "signals of opportunity"—signals whose primary purpose is not to support positioning systems, but which contain useful implicit information about position. These signals of opportunity can include (but are not limited to): terrestrial communications signals; and terrestrial broadcast signals. It would be desirable to exploit these signals to extract as much positioning information as possible from them, as accurately as possible.

It will be understood that any signal that is capable of providing positioning information is also capable of providing timing information, since position and time are related by the speed of the wireless signal (the speed of light, c). Therefore, discussions in this document about the determination of position apply similarly to the determination of time.

SUMMARY OF THE INVENTION

The invention is defined by the claims. According to a first aspect of the present invention, there is provided a method of estimating one or more characteristics of a communications channel, the method comprising:

receiving a first wireless signal transmitted by a transmitter at a first set of frequencies in a first time slot;

receiving a second wireless signal transmitted by the transmitter at a second set of frequencies in a second time slot, wherein the second set of frequencies partially overlaps with the first set of frequencies and the second time slot is different from the first time slot; and jointly processing the first wireless signal and the second wireless signal to estimate the one or more characteristics of the communications channel.

The first and second wireless signals are transmitted coherently by the transmitter. This means that there is a known, preferably fixed (constant) relationship between a carrier phase of the first wireless signal and a carrier phase of the second wireless signal. If the carrier phases do not have a fixed relationship, and therefore the relationship varies over time, then the relationship preferably varies in a deterministic way, such that it is always known, for any given time. For example, a frequency offset between the carrier phases would give rise to a phase difference between them that varies predictably over time.

The first and second time slots are preferably non-overlapping time slots. The transmitter preferably does not transmit the first wireless signal in the second time slot and does not transmit the second wireless signal in the first time slot. In particular, the first wireless signal is preferably transmitted only in the first time slot and the second wireless signal is preferably transmitted only in the second time slot.

In some embodiments, a third wireless signal may be transmitted by the transmitter in the first time slot, at frequencies other than the first set of frequencies and a fourth wireless signal may be transmitted by the transmitter in the second time slot at frequencies other than the second set of frequencies. The receiver may receive the third and/or fourth wireless signals, but may ignore them when jointly processing the first and second wireless signals.

In some embodiments, a fifth wireless signal may be transmitted by the transmitter in a third time slot, different from the first time slot and the second time slot. The fifth wireless signal may be transmitted at frequencies in the first set of frequencies, frequencies in the second set of frequencies, and/or frequencies other than the first and second sets of frequencies.

The first and second wireless signals may be synchronisation signals (typically signals whose format, characteristics, and/or content is known in advance at the receiver). The third, fourth, and/or fifth wireless signals may be data signals (typically signals whose format, characteristics, and/or content is not known in advance at the receiver).

The transmitter is preferably a terrestrial communications transmitter. Each wireless signal is preferably a terrestrial communications signal.

The first and second wireless signals are also received coherently. This means that there is a known, preferably fixed (constant) relationship between a carrier phase of a first local oscillator signal used to receive the first wireless signal and a carrier phase of a second local oscillator signal used to receive the second wireless signal.

The first set of frequencies may comprise or consist of a contiguous frequency range, or may comprise or consist of two or more non-contiguous frequency ranges. The same is true for the second set of frequencies.

Here, the statement that the first set of frequencies "partially overlaps" with the second set of frequencies means: (i) there is at least one frequency at which the first wireless signal has a non-zero energy and the second wireless signal has a zero energy; (ii) there is at least one frequency at which the second wireless signal has a non-zero energy and the first wireless signal has a zero energy; and (iii) there is at least one frequency at which both signals have non-zero energies.

Preferably, the first wireless signal has a first centre frequency and the second wireless signal has a second centre frequency, wherein the second centre frequency is different from the first centre frequency.

The first wireless signal may have a first bandwidth and the second wireless signal may have a second bandwidth. A combined bandwidth of the two wireless signals is preferably at least 50% greater than each of: the first bandwidth; and the second bandwidth.

"Jointly processing" the first wireless signal and the second wireless signal means treating them as parts of the same signal, even though they are only partially overlapping in frequency and transmitted in different (preferably non-overlapping) time slots. In particular, this means that the first and second wireless signals are processed coherently, taking into account their respective phases.

Preferably, "jointly" processing the first wireless signal and the second wireless signal means that: the result of the processing is dependent on a value of the first wireless signal at a frequency at which the second wireless signal has a zero energy; and the result of the processing is dependent on a value of the second wireless signal at a frequency at which the first wireless signal has a zero energy. More preferably, the result of the processing is dependent on all (or substantially all) non-zero values of the first and second wireless signals.

The method may additionally comprise receiving one or more further wireless signals and jointly processing these together with the first wireless signal and the second wireless signal to estimate the one or more characteristics. It is not essential that all of the wireless signals partially overlap in frequency; therefore, the further wireless signals might or might not overlap with the first and/or second wireless signals.

Jointly processing the first wireless signal and the second wireless signal optionally comprises: combining the first wireless signal and the second wireless signal to form a composite function; and processing the composite function to estimate the one or more characteristics of the communications channel.

Combining the first wireless signal and the second wireless signal to form a composite function may comprise: processing the first wireless signal to form a first function; processing the second wireless signal to form a second function; and combining the first function and the second function to produce the composite function.

In some embodiments, the first and second functions may be time-domain functions. In other embodiments, they may be frequency domain functions. In either case, the composite function may be a time-domain function or a frequency-domain function.

Each of the first function and the second function is preferably one of: a channel impulse response; and a channel frequency response.

In some embodiments, combining the first wireless signal and the second wireless signal comprises: determining a first channel frequency response based on the first wireless signal; determining a second channel frequency response based on the second wireless signal; and combining the first channel frequency response and the second channel frequency response to generate the composite channel frequency response.

The first wireless signal preferably has a first centre-frequency and the second wireless signal preferably has a second centre-frequency, wherein there is preferably a difference between the second centre-frequency and the first centre-frequency, the method preferably comprising taking into account the difference, when combining the first function and the second function.

Taking into account the difference may comprise aligning the first function and the second function, based on the difference.

In some embodiments, taking into account the difference in centre frequency may comprise compensating for the difference in centre frequency.

If the first function and the second function are channel frequency responses, compensating for the difference in centre-frequency may comprise modifying the phase of at least one of the channel frequency responses. In particular, it may comprise applying a phase-rotation to at least one of the channel frequency responses, which phase-rotation is dependent on the difference in centre-frequency.

The first function may be a first channel frequency response comprising a first set of samples and the second function may be a second channel frequency response comprising a second set of samples, wherein the first set of samples includes samples which do not exist in the second set of samples, and the second set of samples includes samples which do not exist in the first set of samples, wherein the method optionally comprises combining the first set of samples and the second set of samples into a combined set of samples, wherein preferably, when combining the first set of samples and the second set of samples, zeros are inserted in the combined set of samples for samples that do not exist in the first set of samples and/or zeros are inserted in the combined set of samples for samples that do not exist in the second set of samples.

In other words, zeros may be inserted in the combined set of samples for samples that do not exist in the first set of samples (but for which corresponding samples do exist in the second set of samples). Alternatively or in addition, zeros may be inserted in the combined set of samples for samples that do not exist in the second set of samples (but for which corresponding samples do exist in the first set of samples).

In particular, zeros may be inserted for frequencies corresponding to the third and fourth wireless signals, discussed above.

The inventors have been able to establish that inserting zeros within the channel frequency responses, in this way, does not negatively affect the results. Whereas it was known to zero-pad a frequency response at frequencies (samples) at which no signal existed, it was not previously apparent that zeros could be inserted in a region of frequency (or time-frequency) space where there may be an unknown signal, such as the third or fourth signals, mentioned above.

The combined set of samples preferably represents a function whose domain is an extension of the domain of the first function and the domain of the second function.

Combining the first and second channel frequency responses optionally includes summing or averaging the corresponding frequencies—in particular, by taking into account the difference between their centre frequencies. In some embodiments, this comprises summing/integrating the combined set of samples with respect to time, to produce the composite channel frequency response. This may be done, for example, when estimating a time delay.

Combining the first and second channel frequency responses optionally includes summing or averaging over different frequencies In some embodiments, combining the first and second channel frequency responses may include summing/integrating the combined set of samples with respect to frequency. This may be done, for example, when estimating a Doppler frequency.

In the first set of samples, successive samples may be spaced by a first frequency interval. In the second set of samples, successive samples may be spaced by a second frequency interval, wherein the first frequency interval is different from the second frequency interval. In this case, successive samples in the combined set of samples may be spaced by a third frequency interval, wherein the third frequency interval is smaller than the first frequency interval and smaller than the second frequency interval.

Alternatively or in addition, combining the first and second sets of samples may comprise resampling at least one of them. In particular, one set of samples may be resampled so that its frequency interval matches the frequency interval of the other set of samples.

The first function may be a first channel frequency response, and the second function may be a second channel frequency response, wherein processing the composite function optionally comprises performing at least one of: a Discrete Fourier Transform; and an Inverse Discrete Fourier Transform, on the composite function.

The Discrete Fourier Transform and/or Inverse Discrete Fourier Transform may be non-uniform or uniform. In the non-uniform case, it may be a Nonequispaced Discrete Fourier Transform.

The composite function may be a composite frequency response or a composite time domain function.

Performing at least one of: a Discrete Fourier Transform and an Inverse Discrete Fourier Transform, on the composite frequency response, optionally comprises performing at least one of: a Fast Fourier Transform; and an Inverse Fast Fourier Transform.

Jointly processing the first wireless signal and the second wireless signal to estimate the one or more characteristics of the communications channel optionally comprises estimating the one or more characteristics according to a Maximum Likelihood criterion.

Estimating the one or more characteristics according to the Maximum Likelihood criterion may comprise solving a Nonlinear Least Squares problem.

Jointly processing the first wireless signal and the second wireless signal optionally comprises using the SAGE algorithm. In particular, the SAGE algorithm may be used to combine the first channel frequency response and the second channel frequency response, and estimate the one or more characteristics from the composite frequency response. The SAGE algorithm can be shown to provide a Maximum-Likelihood (ML) estimate, in the absence of multipath. However, it is still useful even if multipath effects are present (even if it does not provide a Maximum-Likelihood estimate).

The method may further comprise: receiving assistance information relating to at least one of the first wireless signal and the second wireless signal; and using the assistance information to assist in receiving said at least one wireless signal.

The assistance information preferably describes one or more characteristics of the at least one wireless signal to be transmitted. The one or more characteristics may be absolute characteristics, characterising the at least one wireless signal, or relative, comparative characteristics, which relate one wireless signal to the other wireless signal.

The method may further comprise forwarding the assistance information to at least one other device, to assist said other device in receiving said at least one wireless signal.

The assistance information preferably comprises at least one of, or any combination of two or more of: a type of at least one of the signals to be transmitted; a time at which at least one of the signals will be transmitted; a frequency at which at least one of the signals will be transmitted; a bandwidth of at least one of the signals to be transmitted; a power level with which at least one of the signals will be transmitted; an antenna configuration that will be used to transmit at least one of the signals; a time difference between the first wireless signal and the second wireless signal; and a phase relationship between the first wireless signal and the second wireless signal.

The time difference and the phase relationship are inherently relative characteristics. The frequency, bandwidth, and/or power level may be absolute characteristics or relative characteristics.

The type of the signal may identify a communications protocol or message type of the signal to be transmitted.

The transmitter may be a transmitter of a User Equipment, hereinafter UE, in a wireless infrastructure network.

The transmitter may be a transmitter of a User Equipment, hereinafter UE, in a wireless infrastructure network, wherein the first wireless signal and the second wireless signal are uplink signals, wherein the UE is controlled by a Base Station, hereinafter BS, in the wireless infrastructure network, and wherein the method further optionally comprises: receiving a control signal transmitted by the BS for the UE; and extracting at least some of the assistance information from the control signal.

One or both of the first wireless signal and the second wireless signal may be a synchronisation signal.

Preferably, one or both of the first wireless signal and the second wireless signal is a Long-Term Evolution (LTE), uplink signal. Preferably, each of the first wireless signal and the second wireless signal comprises or consists of a Demodulation Reference Signal (DMRS). The present inventors have recognised that DMRS signals from different time slots can advantageously be combined, to better estimate characteristics of the transmission channel.

The one or more characteristics of the communications channel may include at least one of, or any combination of two or more of: a time delay of the channel; a phase delay of the channel; an amplitude response of the channel; and a Doppler frequency.

The time delay may represent a combined time of arrival for the first wireless signal and the second wireless signal.

The method may further comprise using the one or more characteristics—in particular, the time delay—to assist in the calculation of a position and/or a time. The position may be a position of the transmitter, or a position of a receiver of the first and second wireless signals. The time may be a time at the transmitter, or a time at the receiver.

In some cases, the communications channel may exhibit a plurality of multipath components. Optionally, the one or more characteristics of the communications channel estimated in the method may include at least one of, or any combination of two or more of: a time delay for each of the multipath components; an amplitude for each of the multipath components; and a Doppler frequency for each of the multipath components.

According to another aspect of the present invention, there is provided a computer program comprising computer program code configured to cause one or more physical computing devices to perform all of the steps of a method as summarised above, if said computer program is run on said one or more physical computer devices. The computer program is preferably embodied on a non-transitory computer readable medium.

According to still another aspect of the present invention, there is provided an electronic communications device, comprising:

a first receiver, configured to receive a first wireless signal transmitted by a transmitter at a first set of frequencies in a first time slot;

a second receiver, configured to receive a second wireless signal transmitted by the transmitter at a second set of frequencies in a second time slot, wherein the second set of frequencies partially overlaps with the first set of frequencies and the second time slot is different from the first time slot; and a processor, configured to jointly process the first wireless signal and the second wireless signal to estimate one or more characteristics of the communications channel In some embodiments, the first receiver and the second receiver may be the same receiver. The (or each) receiver preferably comprises: a low noise amplifier and radio filters; an analogue circuit fed by a synthesiser driven by a local oscillator to mix the received wireless signal to baseband frequencies and to filter it to select the desired signal; an analogue to digital convertor; and a digital baseband processor together with software to demodulate and measure the received wireless signal.

The electronic communications device may be configured to send the estimated one or more characteristics to a second device.

The second device may be any suitable type of device, including but not limited to: a server computer, and a second electronic communications device. The second device may use the one or more characteristics to assist in the calculation of a position and/or a time.

According to yet another aspect of the present invention, there is provided a transmitter device, configured to:

transmit a first wireless signal at a first set of frequencies in a first time slot;

transmit a second wireless signal at a second set of frequencies in a second time slot, wherein the second set of frequencies partially overlaps with the first set of frequencies and the second time slot is different from the first time slot, wherein the first and second wireless signals are transmitted coherently.

The transmitter preferably comprises a digital baseband processor together with software to generate a modulated signal, a digital to analogue convertor, an analogue circuit fed by a synthesiser driven by a local oscillator to mix the modulated signal to the transmission centre frequency, an RF power amplifier to provide the output signal, and a controller to control the modulation, frequency and output of the first respectively second signal transmissions.

The transmitter device may be one of: a transmitter of a Base Station in a wireless infrastructure network; and a transmitter of a User Equipment in a wireless infrastructure network.

The transmitter is optionally configured to provide, to at least one other device, assistance information relating to at least one of the first wireless signal and the second wireless signal, so as to assist a receiver in receiving said at least one wireless signal.

BRIEF DESCRIPTION OF THE DRAWINGS

The invention will now be described by way of example with reference to the accompanying drawings, in which.

DETAILED DESCRIPTION

Figure 1:
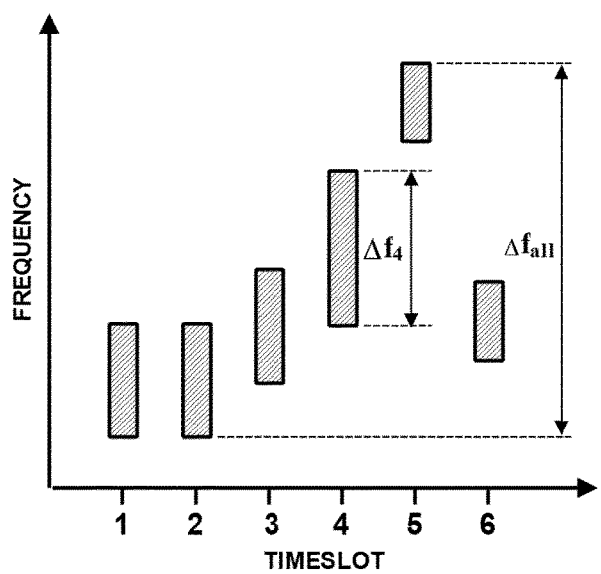
FIG. 1 shows a frequency map for a sequence of uplink slots in an LTE application.

Particularly useful embodiments of the present invention relate to wireless infrastructure networks. As used herein, a "wireless infrastructure network" is defined as a wireless network that is organised in a hierarchical manner, comprising one or more instances of User Equipment (UE), wherein each UE communicates with and is served by a Base Station (BS). The communications between each UE and its serving BS are controlled by the BS. Typically, access to the wireless medium is strictly controlled by the BS, which is responsible for coordinating and orchestrating the PHY and MAC layers. Direct, spontaneous, radio communication between UEs is typically not allowed. Types of wireless infrastructure networks include but are not limited to: cellular networks; and Wireless LANs.

Uplink signals are of particular interest, in embodiments of the present invention. That is, we are particularly interested in intercepting first and second wireless uplink signals from a UE to its BS; using these signals for estimating one or more channel characteristics; and, ultimately, using the estimated one or more channel characteristics for positioning and/or timing determination. However, it will be understood that the present invention is not limited in this way—the first and second wireless signals may also be downlink signals from a BS to a UE. Furthermore, in some embodiments, the first and second wireless signals need not be signals in a wireless infrastructure network. For example, they may be broadcast signals, or signals in an ad hoc or peer-to-peer network.

The channel characteristic of primary interest in many embodiments is the time delay of the channel. The time delay estimated for the channel can provide a combined time of arrival of the wireless signals. As will be understood by those skilled in the art, such a time of arrival can be particularly useful for positioning and/or timing calculations. However, the invention is not limited in this way—in other embodiments, one or more channel characteristics other than the time delay may be estimated.

In summary, although the following description will focus on the estimation of time delay (time of arrival) for uplink signals in a wireless infrastructure network, this is just one exemplary application, which is used for the purposes of explanation and is not to be understood as limiting the scope of what is disclosed in any way.

Exemplary Application

We wish to measure the time of arrival of the signal received from a transmitter, in order to estimate the time of flight, and thus the range, and use this for the estimation of position. In a typical example of a cellular communication system, the signal in each uplink slot is normally processed by the receiver separately from the signals in other uplink slots. In some systems, multiple slots are used, but in such systems this is regarded as a constraint, with the slots needing to have a regular, repeating, pattern, in order to be suitable for processing.

For accurate position- (or time-) estimation we wish to measure the time of arrival of the signal precisely. The precision with which the timing can be measured depends on the bandwidth—the greater the bandwidth occupied, the more precise the measurement. It is therefore desirable to use a wide-band signal to measure the time of arrival.

In embodiments of the present invention, the aim is to opportunistically receive and coherently combine the processing of multiple signal transmissions, which may be transmitted in an irregular and ad hoc manner (as determined "live" by the base station and the needs of the communication channel), and which partially overlap in frequency.

FIG. 1 is an illustrative frequency map for a sequence of uplink slots in an LTE application. Because the communications signals are scattered over a wider frequency band than any one signal transmission on its own, the receiver and measurement processing can, as a result of the combination, exploit the full bandwidth of the signal transmitted. This bandwidth is statistically likely to be greater than the bandwidth of the transmissions of any single slot. Bandwidth relates directly to precision; therefore, the increased bandwidth improves the precision of the measurement and the positioning.

Of particular interest is the case when the receiver is the receiver of a second UE in the wireless infrastructure network, which intercepts the uplink signal of a first UE. However, the receiver may also be the receiver of the BS (as is more conventionally the case).

The applicability of the present approach is not limited to cellular networks. Similar situations may arise in the ISM band, for frequency hopping and direct sequence spread spectrum signals, with multiple systems, signals, and ad hoc adaptations in the signal frequency allocations to avoid interference.

Cellular Positioning Using the Uplink Signal from a Neighbouring UE

We wish to measure the distance between two devices as part of a positioning system, by measuring the time of flight of a signal transmitted by one modem, and received by another modem. Particular examples of the application are for the localization of a device in a building, or the tracking of the relative position of vehicles (V2X). It is convenient for many reasons (including cost and availability) if we can reuse existing communication systems and signals for this purpose.

Figure 2:
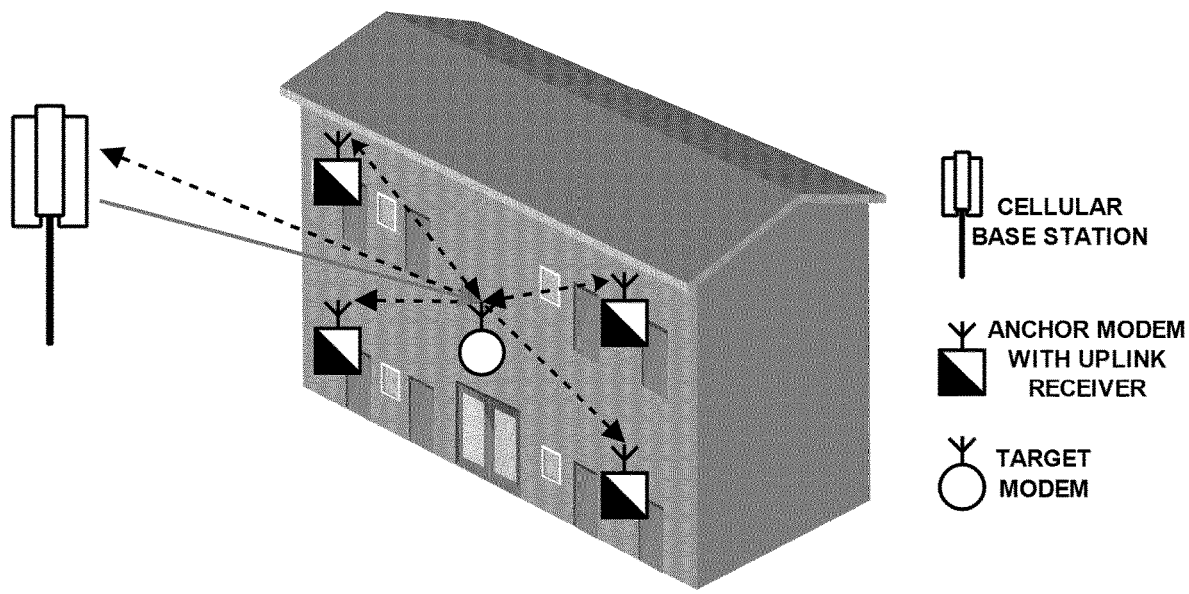
FIG. 2 illustrates positioning with anchors measuring the uplink signals from a target UE.

A good example is the location of a target modem in a building using anchor modems, as illustrated in FIG. 2. This illustrates positioning with anchors measuring the uplink signals from a target UE. The anchors are able to receive uplink signals. They are preferably synchronised by some means (for example, using GNSS signals). The target UE is not synchronised with the anchors; therefore, there is an unknown offset between the UE's clock and the synchronised clocks of the anchors. A number of the anchors are conveniently placed in known locations around the building. The target modem is in communication with the cellular base station, and the uplink signal that it transmits to the base station is listened to, intercepted and measured by the anchors. The time of arrival of the signals is used by a positioning engine to estimate the position (and clock time) of the target modem.

Figure 3:
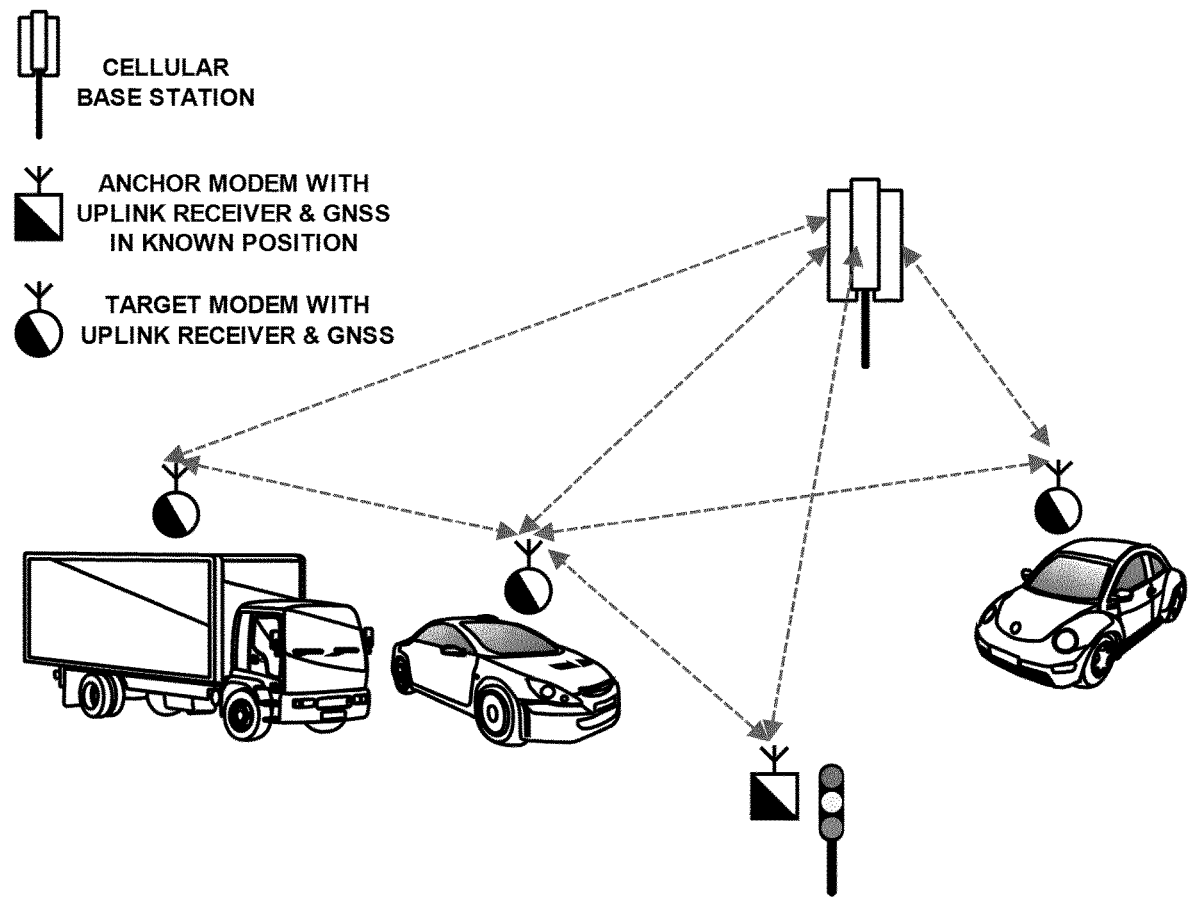
FIG. 3 illustrates positioning with vehicles and roadside devices measuring each other's uplink signals.

A further application example is shown in FIG. 3, which illustrates positioning with vehicles and roadside devices measuring each other's uplink signals. Similarly in this case, the UEs are in communication with a BS, and their uplink transmissions are received, intercepted and measured by neighbouring devices, which are then able to use this information for estimating their position and local clock timing. Like the target UE in FIG. 2, the time at each UE is an unknown.

The LTE Uplink Signal

Figure 4:
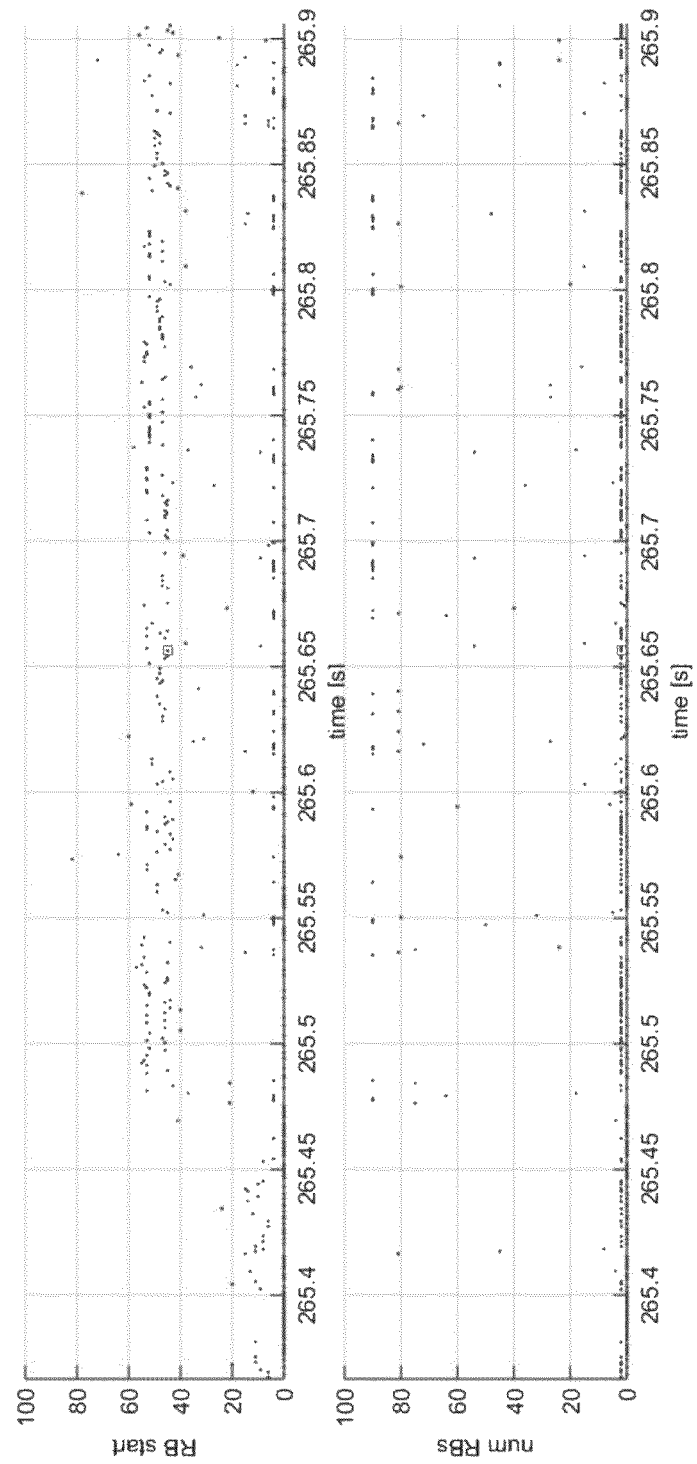
FIG. 4 illustrates dynamic allocations by the base station of the uplink capacity allocated to a modem.

As mentioned above, the uplink signal bandwidth to be transmitted by a UE is allocated by the network, which will allocate a sequence of slots. The centre-frequency and bandwidth allocated is likely to be different in each slot, partly in order to meet the changing communication needs of all the UEs being served by the network, and partly to provide some frequency diversity in the uplink channel. This is illustrated in FIG. 4, showing the uplink frequency Resource Blocks allocated to a modem (UE) during the process of a file upload. Both the starting block number and the number of resource blocks can be seen to be changing for successive slots. (Strictly speaking, the LTE example shown here represents the allocation for each sub-frame, comprising a pair of slots.) Conventionally, the transmission in each slot is generated independently and received independently by the cellular base station.

Synchronisation signals with different bandwidths are of particular interest here. In the context of LTE, this includes:

The Demodulation Reference Signal DM-RS, which is transmitted together with the normal uplink data transmission, with the same bandwidth as the data transmission, to enable the base station to demodulate the transmitted uplink signal, taking into account the current channel impulse response for that piece of signal spectrum;

The Sounding Reference Signal SRS, which is transmitted over a wide bandwidth on the command of the base station, to provide the network with a general measurement of the uplink channel available from the UE.

Measuring a Set of ISM Band Signals

Figure 5:
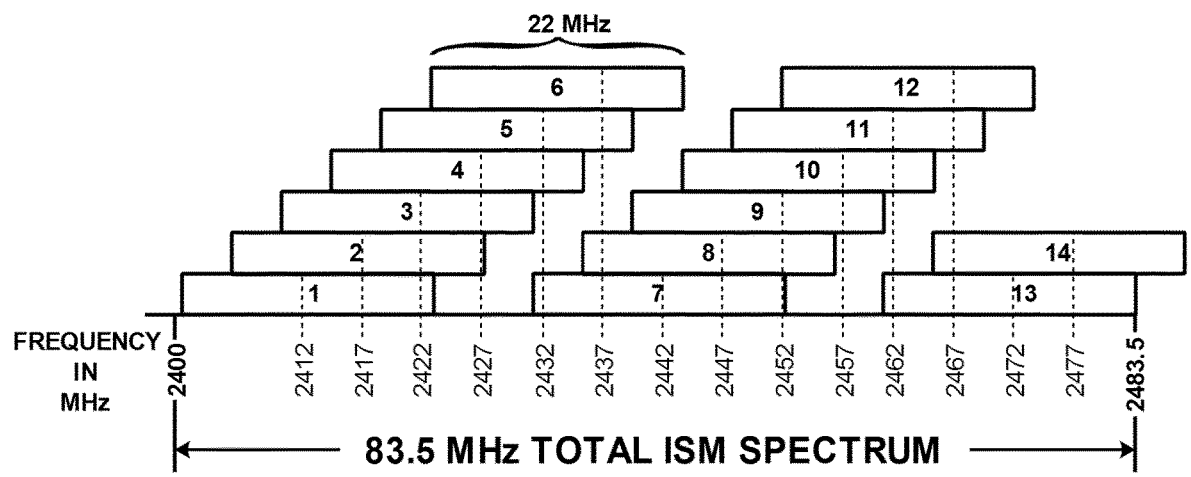
FIG. 5 illustrates WiFi channels in the 2.4 GHz band.

In the ISM bands, also, ad hoc signals may be used for positioning. Considering some signals popularly used in the 2.4 GHz ISM band:

WiFi signals are direct sequence spread spectrum signals with 22 MHz bandwidth for 802.11b, and are centred on channel frequencies with a spacing of 5 MHz, as illustrated in FIG. 5. Ideally, a set of three channels is used—for example, channels 1, 6 and 11. Other systems and other communication will be taking place on other channels; so, a non-optimal choice may have to be made, with overlapping channels. More modern 802.11 OFDM-based specifications such as 802.11n/adax have wider bandwidths, such as 80 MHz, and so will lead to greater signal overlaps.

Figure 6:
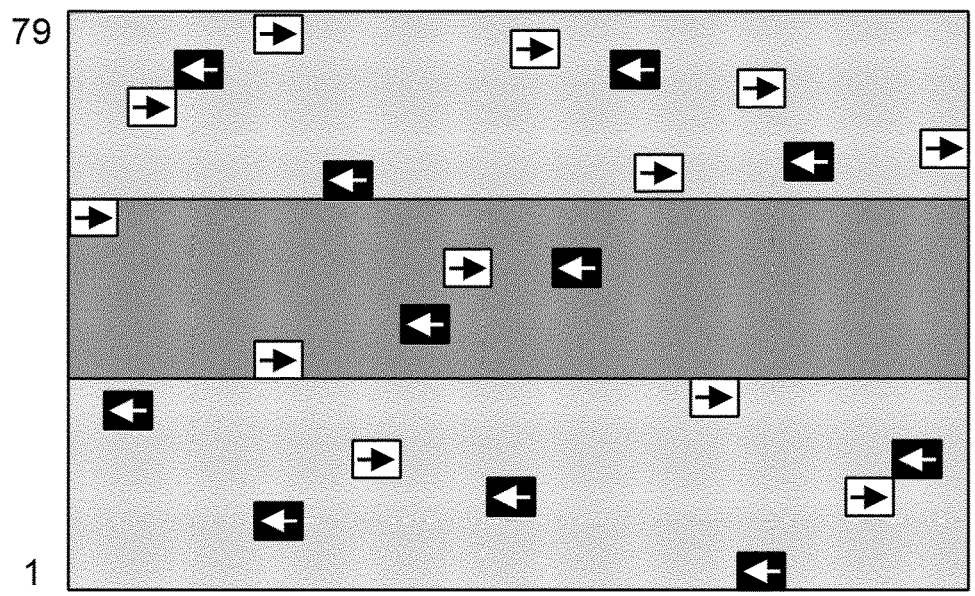
FIG. 6 illustrates Bluetooth channels in the 2.4 GHz band, which as a result of Adaptive Frequency Hopping may dynamically overlap with a WiFi channel signal.

Bluetooth signals are frequency hopping signals with each hop occupying 1 MHz bandwidth, with a pseudorandom pattern to reduce the effect of interference, as illustrated in FIG. 6. In this schematic diagram, the vertical axis shows the ISM frequency band at 2.4 GHz, with the annotation referring to the 79 Bluetooth channels (each of 1 MHz).

Figure 7:
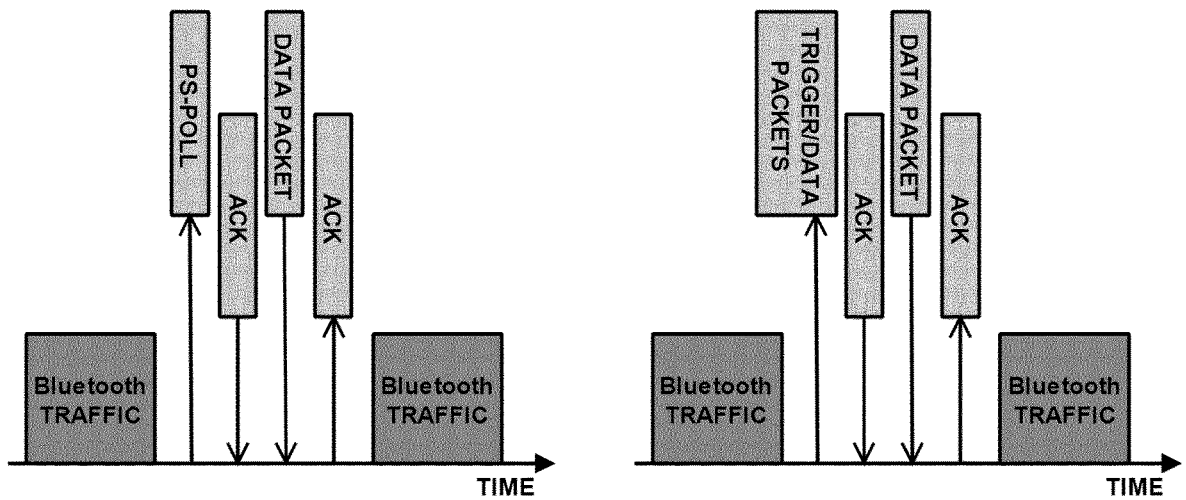
FIG. 7 shows examples of time-multiplexing WiFi protocol communications, in between Bluetooth activity.

Furthermore, there may be combi-devices supporting both WiFi and Bluetooth operation. As illustrated in FIG. 7, in such cases a device may operate for one time interval as a WiFi device (with a broad bandwidth) and for another time interval as a Bluetooth device (with its frequency hopping). These signals may then partially occupy (in different time slots) the same frequency spectrum in the ISM band.

This illustrates that the spectrum used by transmitters in the ISM band is highly variable, depending on the communication needs of the network and the interference currently being experienced by the various receivers. WiFi devices may operate on multiple channels over a period of time. Access points may dynamically change the channel on which they are operating in order to minimise interference, with the UE terminals (stations) with which they are communicating following accordingly. These channels are likely to partially overlap, as shown in the examples in FIG. 5 and FIG. 6, but for reasonably static applications the ranging measurement can be performed over a wider bandwidth, and with greater precision, according to an embodiment of the present invention.

Multi-channel operation is possible in single ISM transceivers. For example:

Transmitters may contain dual base-band paths, to generate multiple channels;

Receivers may be specified to be able to monitor secondary channels at intervals and can therefore be designed to occasionally receive secondary signals for a combined multi-frequency measurement. The impact on the communications link and the energy consumption can be kept limited, particularly if the receiver is to capture the signal from a single known additional secondary channel, and if the task is only performed occasionally.

Depending on the system requirements, the following measurements may be desirable:

The time of arrival at a station (UE) of multiple signals from an Access Point (BS);

The time of arrival at an Access Point (BS) of multiple signals from a station (UE); and/or The time of arrival at a second station (UE) of multiple signals from a first station (UE), either as a result of Ad Hoc networking and communication between the two stations, or as a result of the second station intercepting uplink signals from the first station (UE) to its Access Point (BS).

If the transmitter and receiver are each designed to operate coherently, all of these signals may be received, combined, and jointly processed by the receiver as described in greater detail below, to estimate the time of arrival of the signal from the transmitter, with the performance benefit that results from the bandwidth and coherent processing of the combined signal.

General Overview

Figure 8:
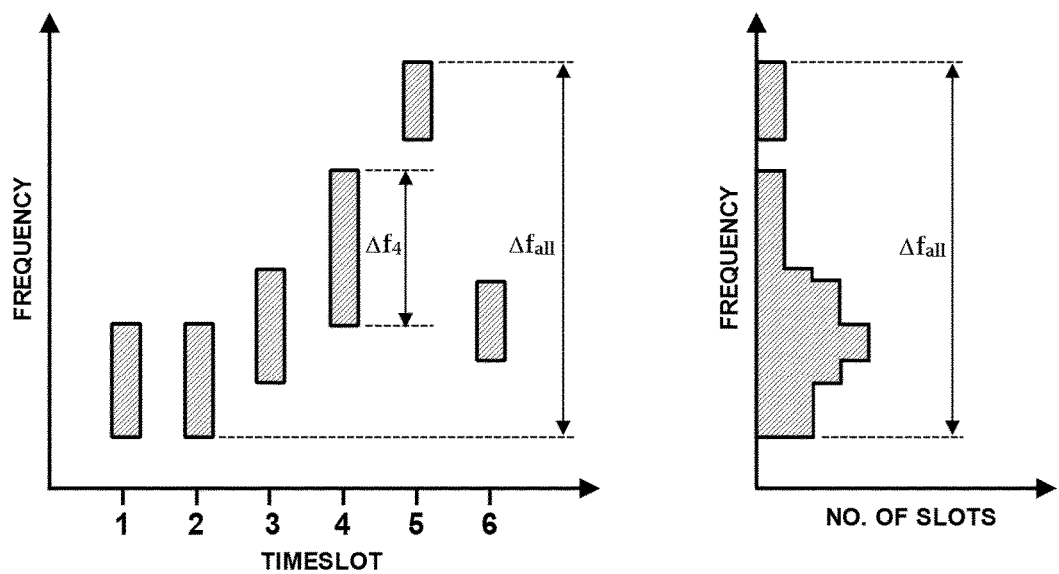
FIG. 8 shows an exemplary frequency map for a sequence of uplink slots.

According to preferred embodiments of the invention, a single time of arrival measurement is made by jointly estimating a single time of arrival from multiple wireless signals, which have different, partially overlapping, frequency spectra. Viewed in the frequency domain, as illustrated in FIG. 8 for a set of signals transmitted in a different time slots, the signals overlap and may have gaps. A key idea in embodiments of the invention is to form and use a composite of the signals to jointly estimate the time of arrival.

A listening receiver intercepts, receives, and processes multiple wireless signals from the transmitter, and estimates the time of arrival of the signal. Multiple wireless signals from the source are received by the receiver at different frequencies. At least two of the wireless signals overlap in frequency. The signals are processed combined together, to estimate the time of arrival.

In general, the signals are transmitted at different times. They may have different frequency bandwidths. They may cover a total frequency bandwidth range $\Delta f_{all}$, which is greater than the maximum bandwidth $\Delta f_{max}$ of the signal in any one slot (which is $\Delta f_4$ in the illustration of FIG. 8). To take advantage of this, the transmissions by the transmitter should be transmitted coherently, with a known carrier phase relationship between each slot. The receptions by the listening receiver are received coherently, with a known phase relationship between each slot. The coherence of the transmitter and the coherence of the receiver allow the signals to be combined optimally, to fully exploit the benefit of the wide bandwidth occupied by the set of signals.

The time of arrival measurement may be used to assist in the estimation of the position, time or velocity, of the receiver and/or the source transmitter. Embodiments of the invention are particularly relevant for situations when the signals to be measured are opportunistic, as in this case the signals are likely to partially overlap (rather than being separate, or being the same, for example). In such a system, the allocation for each slot is typically determined dynamically by some other system (other than the positioning system), as a result of a variety of factors. These factors may include:

The needs of a communications system (with its varying needs for communications capacity, and perhaps the varying location of the intended recipients of the transmitted signals);

Varying interference or propagation conditions in the environment, causing the allocations of the transmitted signals to be adapted The consequence of a system operated by a third party (such as a third party network operator).

The signal spacings may not be well controlled, and are typically not designed for the purposes of time of arrival measurement (and therefore typically not regular and well spaced). There may be different signals being transmitted by the same transmitter—for example: different message signals with different bandwidths; or different signals for different systems (for a combined WiFi/Bluetooth device).

Prior Assistance

In some cases, the intended schedule of transmissions is determined in advance by the transmitter. It may then provide assistance to the receiver, providing information such as:

- message types to be sent, if applicable (for example, Bluetooth or WiFi, synchronisation or sounding signal type)
- time sequence, start frequency, and frequency bandwidth of transmissions;
- precise time and phase relationships between transmissions; and/or
- signal characteristics such a power level and antenna configuration used.

Such information may be sent as control messages or as ordinary data traffic to the receiver—for example, over the wireless infrastructure network, or some other network, as appropriate. The receiver can use the assistance information to schedule the interception of the transmissions, and to support the combination of the signals into a single coherent data set for processing.

Dynamic Interception

Figure 9:
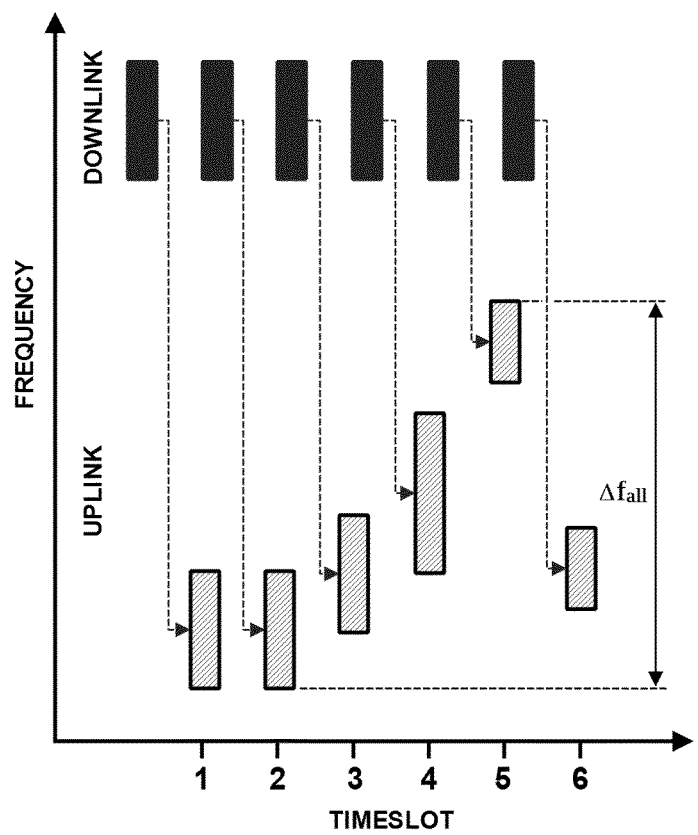
FIG. 9 illustrates the interlacing of downlink signals containing control information from the base station used for the setting (and interception) of subsequent uplink signals from the UE.

In some cases, the activity of the transmitter might change dynamically, rather than following a stable predetermined sequence. This situation arises in the case of the combination and measurement of the uplink signals of a neighbouring modem (UE). In this case, in order to intercept each uplink slot, the listening receiver can: listen to the downlink signal transmitted to the neighbouring UE by the base station; decode the instructions to the neighbouring UE from the base station about the forthcoming uplink frequency allocation which the neighbouring UE should use for its transmission; and use this information to tune correctly and intercept a later uplink signal from the neighbouring UE in the current or a following timeslot. That is, the receiver can obtain assistance information at least partly from the downlink signal and can use the obtained assistance information to intercept a subsequent uplink signal. This is illustrated in FIG. 9.

The listening cellular receiver in this case has to interlace reception of the downlink signals with the reception of the uplink signals. Note that the listening receiver should still maintain coherence between the reception of the uplink signals, even though it operates on other frequencies between successive slots. The downlink signal is often higher in frequency than the uplink signal, but this is not always the case. In practice, the downlink signal may contain information about the timeslot which is a few in advance of the current slot, in order to give the UE time to schedule correct operation. In frequency division duplexing (FDD) LTE, two slots are combined to make up a subframe. Therefore, strictly speaking, each block in FIG. 9 would refer to a subframe comprising a pair of slots and lasting 1 ms. At the start of the multi-slot measurement, the listening receiver does not know which slots and frequencies are going to be used. This is opportunistic, and only becomes apparent during the course of the measurement, from the downlink signals, which are being intercepted over the interval.

In some cases, the receiver may obtain assistance information from multiple sources. For example, the receiver might obtain assistance information that is stable or slowly changing from the transmitter, while assistance information relating to dynamic scheduling may be obtained from the downlink signal.

Further information about the interception of uplink signals from neighbouring UEs can be found in WO 2018/099568 and WO 2018/100189, the teachings of which are incorporated herein by reference.

Processing of the Multiple Slot Signals

Figure 10:
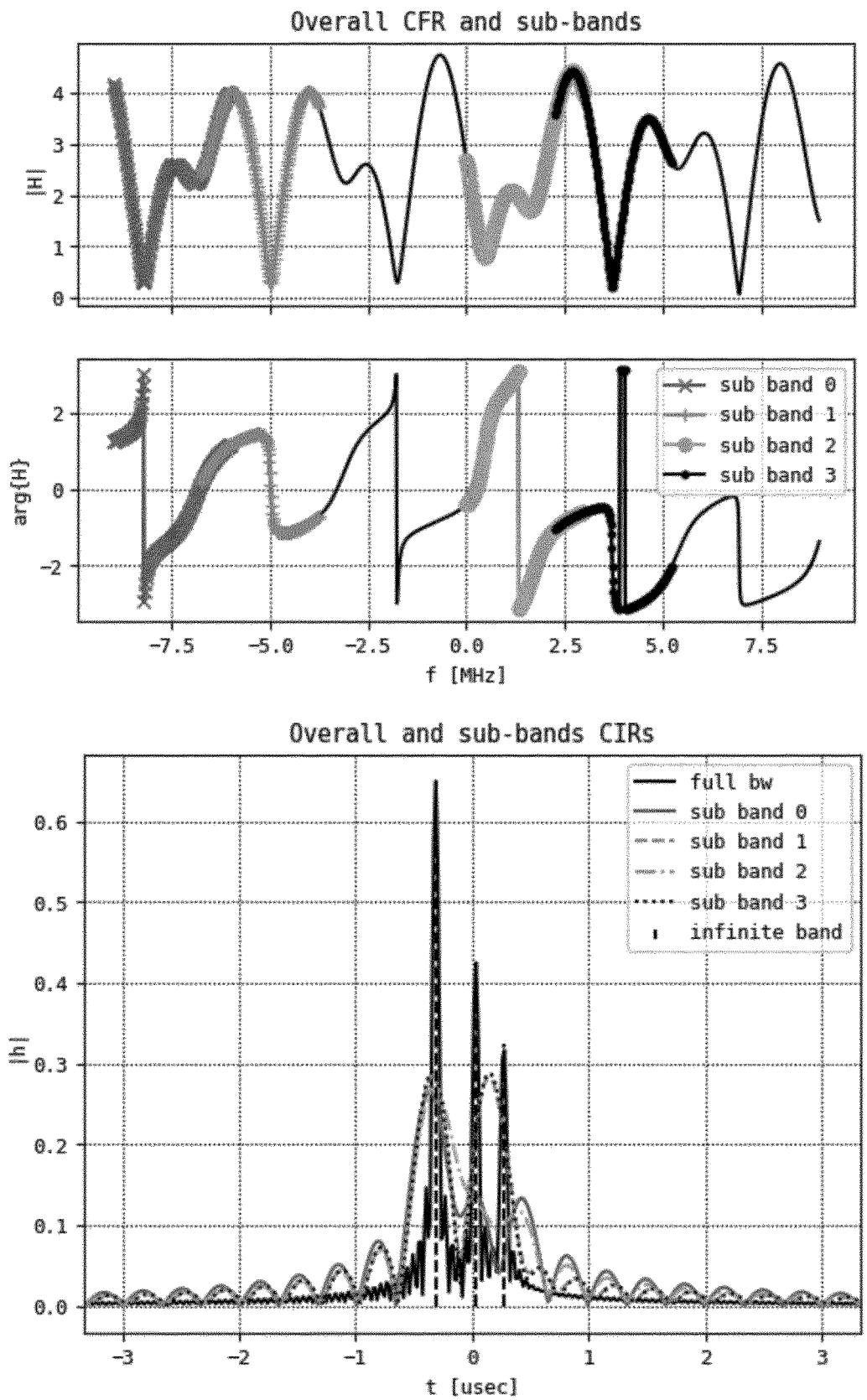
FIG. 10 shows the frequency response for a channel modelled with the direct path and two multipath reflections, with the impulse response measurable from individual subbands compared with the full channel bandwidth.

The set of the multiple signals are together processed to produce a single time of arrival estimate. According to one embodiment, this can be done using the Space-Alternating Generalized Expectation-Maximization (SAGE) algorithm to combine the signals from discontinuous sets of signal slots on different frequencies. FIG. 10 illustrates an example for a cellular LTE uplink signal comprising four sub-bands, as would be obtained from four slots, in a propagation channel that is modelled as a direct path with two reflections arising from multipath. In this example, the frequency of the signal in the sub-band labelled sub-band 0 overlaps partially with the frequency of the signal in the sub-band labelled sub-band 1, and similarly the signals in sub-bands 2 and 3 overlap in frequency. The time delays associated with the direct path and the two reflections are indicated by the dashed vertical lines in FIG. 10. The time of arrival to be estimated is the first peak in the Channel Impulse Response (CIR), obtained by transforming the signal from the frequency to the time domain.

The impulse response is shown as it would be estimated from each slot individually; and this is compared with the impulse response obtained for the multiple slots together. It can be seen that, if the full bandwidth is measured, then much greater resolution is possible compared with just using the measurement of each sub-band (slot) on its own. The peaks in the combined CIR are much sharper, such that the individual multipath components can be distinguished, and the accuracy is much better.

To combine the different time-slots correctly, the signals for the slots need to be processed with the correct frequency offset, corresponding to the frequency offset with which they are transmitted and received. Gaps in the spectrum covered in the set of signal slots received are respected. The signals are sampled in a non-uniform manner. Signals and information correspond (only) to the frequency range in which they are received, and no assumption is made about parts of the channel in which no signal is received. The sampling is opportunistic and dynamic, depending on the frequency allocations for the signals that happen to be transmitted according to the instructions sent by the base station.

Figure 11:
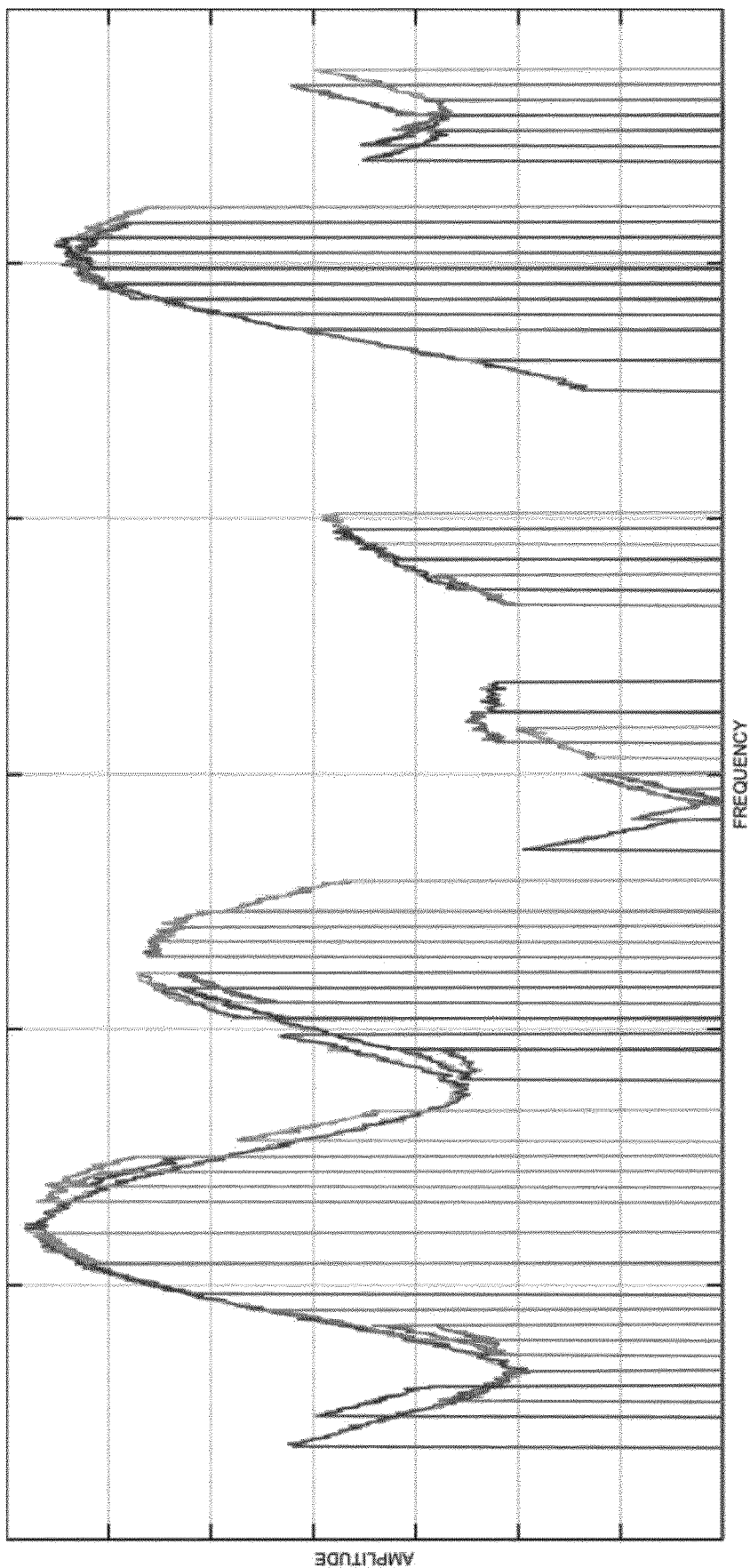
FIG. 11 illustrates an exemplary composite channel frequency response estimated from an ad hoc set of LTE uplink signals.

Using these principles, the inventors have demonstrated the processing of LTE signals successfully using the SAGE algorithm as described in greater detail below, measuring sets of Demodulation Reference (DMRS) signals. These are the uplink reference signals used in each LTE slot for the base station to estimate the channel for that slot, to support the demodulation of the data transmitted. The SAGE algorithm inherently includes frequency- and time-domain processing to estimate the signals that make up the overall channel impulse response. In a preferred embodiment, the SAGE algorithm is modified so as to include the rotation corresponding to the frequency offset of each particular slot. Experimental results illustrating the interception of a number of slots of an LTE uplink are shown in FIG. 11. This shows a combined channel frequency response estimated by combining an ad hoc set of LTE uplink signals in different time slots.

Efficient Processing

It can be much more efficient to process signals using fast algorithms such as the FFT. These commonly assume a uniform sampling of the signal. For a non-uniform set of signals, a Non-uniform Discrete Fourier Transform may be used. However, this is inconvenient to handle, and inefficient, because techniques such as the FFT and its inverse cannot readily be brought to bear. In contrast to sets of signals that may be well separated, regular, or adjoining in frequency, this is a particular intrinsic problem when signals are to be combined which partially overlap, as they cannot easily be manipulated to form a uniform data set. This situation particularly arises when attempting to use multiple ad-hoc signals. As a solution, in preferred embodiments of the present invention, it is suggested that frequency samples that are not present in the data set are filled with zeros, as illustrated diagrammatically in FIG. 12, for the example in FIGS. 1 and 8.

Note that, when we do this, we are inserting zeros in place of signals which would—if we knew them—have genuine values. The filled version of the signal spectrum cannot therefore be regarded as a true representation of the transmission channel. However, it has been shown by the inventors that the "holes" can be filled with zeros to produce a uniform set of samples, and that this internally filled, uniform sample set can then be used for the purpose of the iterative Least Squares convergence used in SAGE, without affecting the correctness of the resulting estimate of the Channel Impulse Response. Consequently, a uniform signal set can be created and used for convenient, fast, processing of the irregular signal.

The "missing" samples that are filled with zeros may include at least samples that exist in the first wireless signal but not in the second wireless signal, and samples that exist in the second wireless signal but not in the first wireless signal. In some cases, further wireless signals may be jointly processed along with the first and second wireless signals (as mentioned already above). In some cases, these further wireless signals do not overlap with the first and second wireless signals in the frequency domain (see, for example, the signal in timeslot 5 in FIGS. 1, 8, and 9). In this case, zeros may be inserted to fill a gap in the spectrum, where none of the first, second, and further wireless signals exists.

Embodiment

Figure 13:
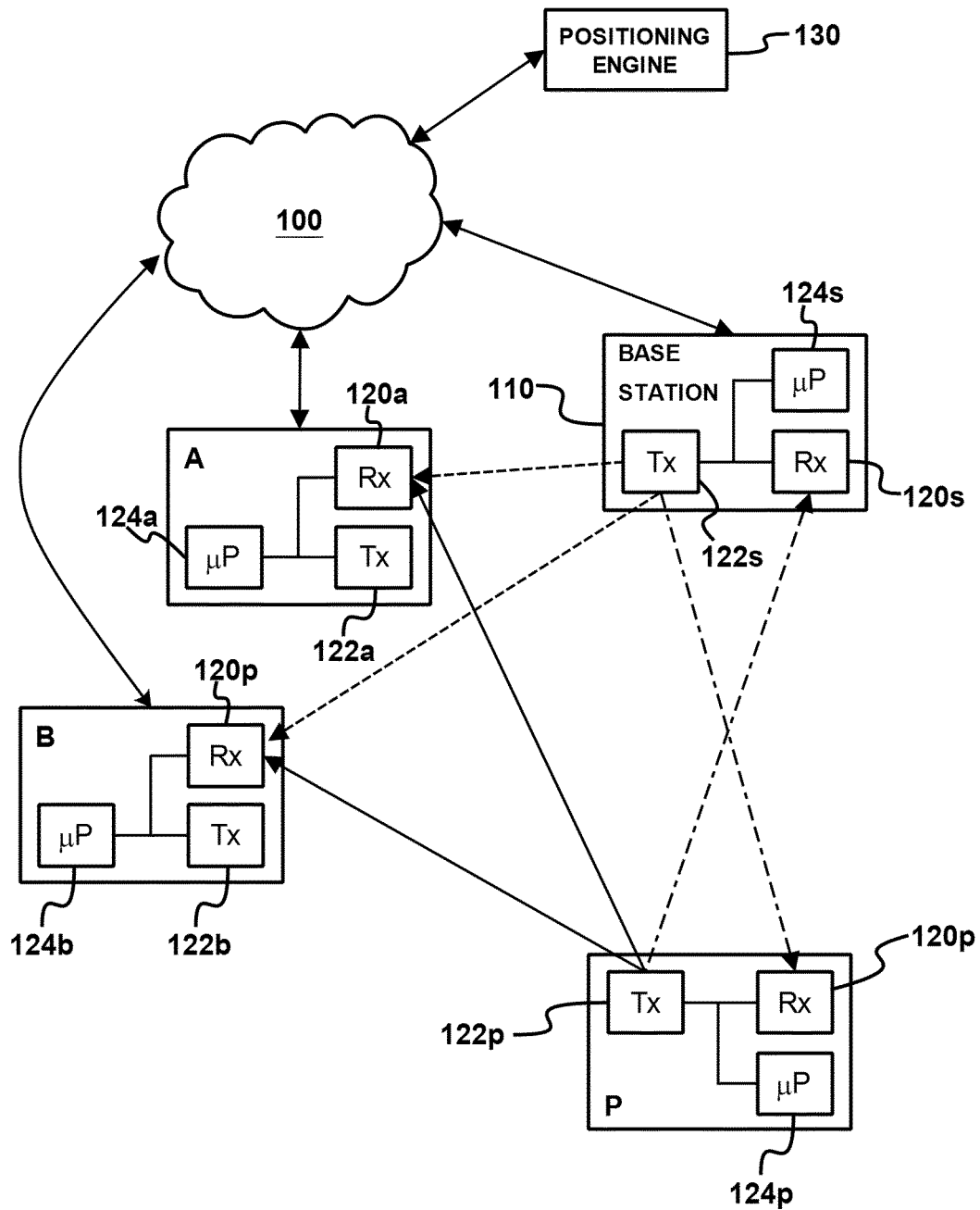
FIG. 13 is a schematic block diagram of a wireless infrastructure network with devices operating according to an embodiment of the invention.

A detailed embodiment of the invention will now be described, with reference to FIGS. 13-15. FIG. 13 is a schematic block diagram showing a wireless infrastructure network in which one or more of the devices operate according to an embodiment of the present invention.

Three UEs A, B, and P are shown, for the purposes of explanation. In a full positioning system there may be more devices (as illustrated previously in FIG. 2), normally with at least three anchor UEs to determine a position in two dimensions, and to determine (or cancel) local clock time. Each UE comprises a receiver 120, a transmitter 122, and a processor 124. The BS 110 controlling UE P is shown, but the BSs controlling the other two UES are not shown, for simplicity. The BS 110 comprises a receiver 120s, a transmitter 122s, and a processor 124s. The transmitter 122s is configured to transmit a downlink signal to the receiver 120p of UE P. The receiver 120s is configured to receive an uplink signal transmitted by the transmitter 122p of UE P. These uplink and downlink signals are indicated by dash-dot arrows in the drawing. The UE P is connected to its BS 110 by these uplink and downlink signals. The other UEs are similarly connected to their BSs (not shown). All of the UEs are connected (via their BSs) to network 100, as indicated by the double-headed arrows in the drawing. This network 100 may for example include portions of backhaul network, backbone network, and the global internet. The UEs can connect to a positioning engine 130 via the network 100. The UEs may also connect to one another via the network 100.

The positioning engine 130 may be provided, in one embodiment, by a server computer. It may be implemented in hardware or software, or both. The positioning engine may be responsible for positioning (or timing) calculations, in some examples.

In the example shown, the receivers 120a and 120b of UEs A and B are able to receive the downlink signal transmitted by the BS 110 for the UE P. This is indicated by the dashed arrows in the drawing. The receivers 120a and 120b of UEs A and B are also able to intercept the uplink signal transmitted by UE P for BS 110. (Here, the term "intercept" is used only in the sense that the uplink signal is not primarily intended for reception by the other UEs—it will be understood that UEs A and B "intercepting" the uplink signal does not prevent the signal reaching the BS 110.) The interception of the uplink signal is indicated by the solid arrows emanating from the transmitter 122p.

The transmitter 122p of UE P is configured to transmit a first wireless uplink signal in a first time slot and to transmit a second wireless uplink signal in a second time slot. The parameters of the signals will generally be controlled by the BS 11. But, at least some of the time, the two wireless signals will overlap partially in frequency. The transmitter 122p is configured to transmit the two wireless signals coherently. In one example, this may be achieved by the deriving the carrier signal for both wireless signals from the same clock or local oscillator, and by controlling the phase trajectory during any changes in the frequency of the synthesiser between timeslots as described in U.S. Pat. No. 8,644,783. However, this is not essential, and the necessary phase relationship could be maintained in other ways. Note that the UE P differs from conventional UEs in this way—conventionally, there is no requirement for a transmitter of a UE to maintain coherence between transmissions in different time slots. The same is true for the transmitter of a conventional BS.

The UE P may additionally be configured to provide assistance information relating to the first and or second wireless signals to one or more other devices (such as other UEs), before UE P transmits the wireless uplink signals. This is to enable the other devices to intercept (receive) the uplink signals.

Figure 14:
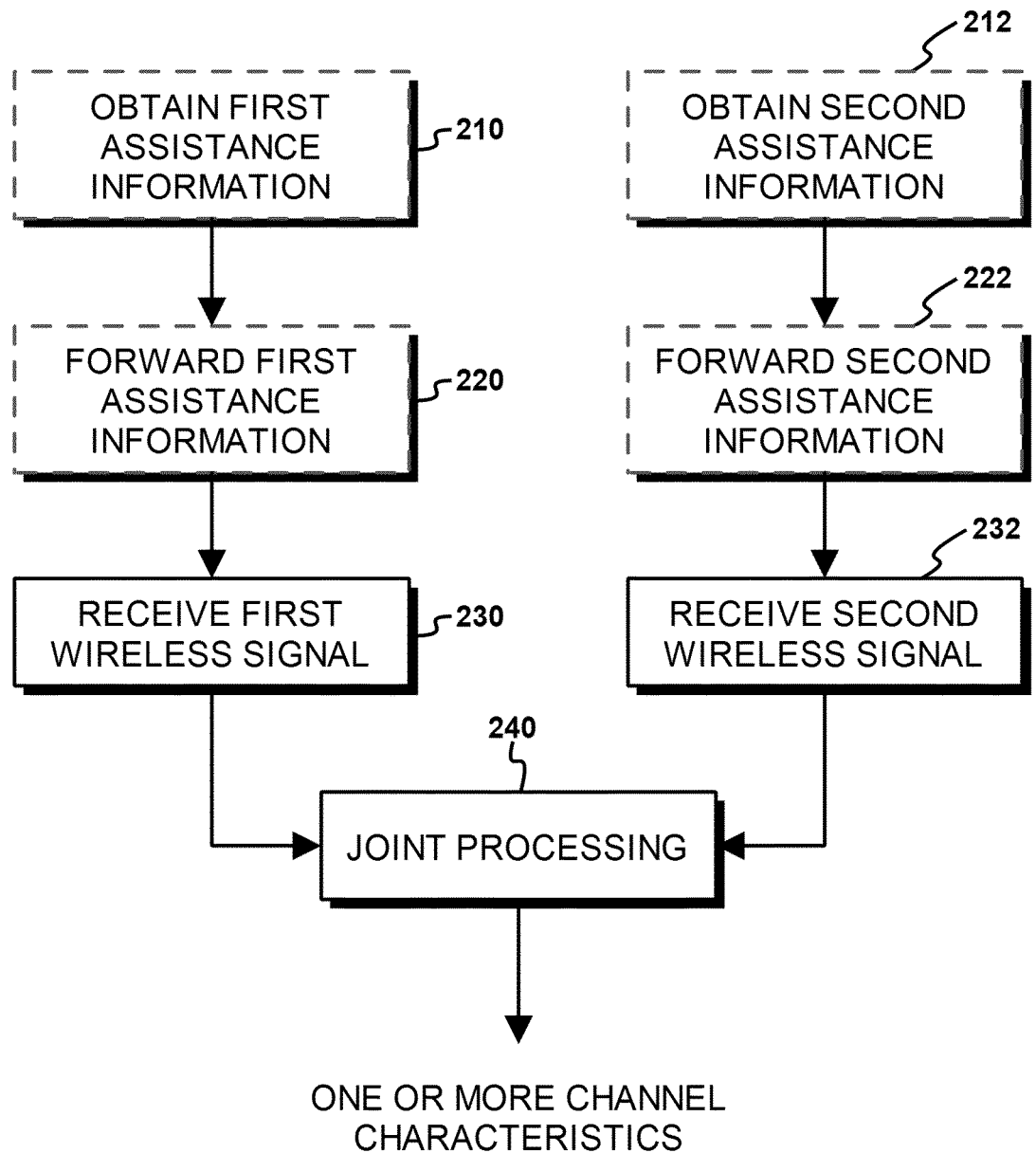
FIG. 14 is a flowchart of a method according to an embodiment.

FIG. 14 is a flowchart illustrating a method performed by UE A, according to an embodiment. Optional steps are indicated by dashed boxes.

In step 210, the UE A obtains first assistance information, to assist it in receiving (intercepting) a first wireless uplink signal from the UE P. In some cases, this assistance information may be shared in advance by the UE P. This may be done as data communication via the network 100. In some cases, the UE A may monitor the downlink signal from the BS 110 to the UE P, and the processor 124a of UE A may extract, from this downlink signal, control information for UE P. This control information may provide at least part of the assistance information needed by UE A to intercept the first wireless uplink signal. Note that the step 210 of obtaining assistance information may be optional in some embodiments—that is, it may be possible to receive the signal from P without needing assistance information. In a further optional step 220, UE A forwards the assistance information to another device—namely UE B. This is done so that UE B can also use it to intercept the uplink signal from UE P. Forwarding assistance information in this way depends upon the assistance information being available early enough that it will still be useful by the time it is received by the second device, UE B. In particular, UE B should receive the assistance information before the time of transmission of the uplink signals by UE P. In step 230, the receiver 120*a* of UE A uses the first assistance information to intercept (receive) the first wireless uplink signal transmitted by the transmitter 122*p* of UE P.

Steps 212, 222, and 232 are substantially the same as the respective steps 210, 220, and 230. In step 212, UE A obtains second assistance information, relating to a second wireless uplink signal to be transmitted by the transmitter 122*p* of UE P. In step 222, UE A forwards the assistance information to UE B. In step 232, the receiver 120*a* of UE A receives the second wireless uplink signal from UE P, using the assistance information to intercept it.

UE A has now received first and second wireless signals transmitted by the transmitter 122*p* in two separate timeslots. These are received coherently, meaning that the carrier phase relationship between them is maintained. One way to ensure this is to derive the local oscillator signal that is used to receive each signal from the same source, such as a common local clock or oscillator, and by controlling the phase trajectory during any changes in the frequency of the synthesiser between timeslots as described in U.S. Pat. No. 8,644,783. This is just one example, and is not essential—the necessary phase relationship can be maintained in any suitable way. Note that the UE A differs in this respect from a conventional UE. Conventionally, a UE is not required to maintain any carrier phase relationship between different time slots.

In this embodiment, the first and second wireless uplink signals are the DMRS signals in the two time slots. These wireless signals partially overlap in frequency, as described already above. Note that the transmitter 122*p* will typically also transmit data signals in the first and second time slots, but these are ignored for the purposes of the present method.

In step 240, the processor 124*a* of UE A jointly processes the two received wireless signals, in order to estimate one or more characteristics of the communications channel between UE P and UE A. In particular, in this embodiment, the processor 124*a* estimates a combined time of arrival of the two wireless signals by estimating a combined time delay of the channel over the two timeslots. This combined time of arrival may be used by UE A to calculate a position (the position of UE A, or the position of UE P, for example). Alternatively or in addition, it may be sent by UE A to another device, such as the positioning engine 130, for use in positioning and/or timing calculations.

Figure 15:
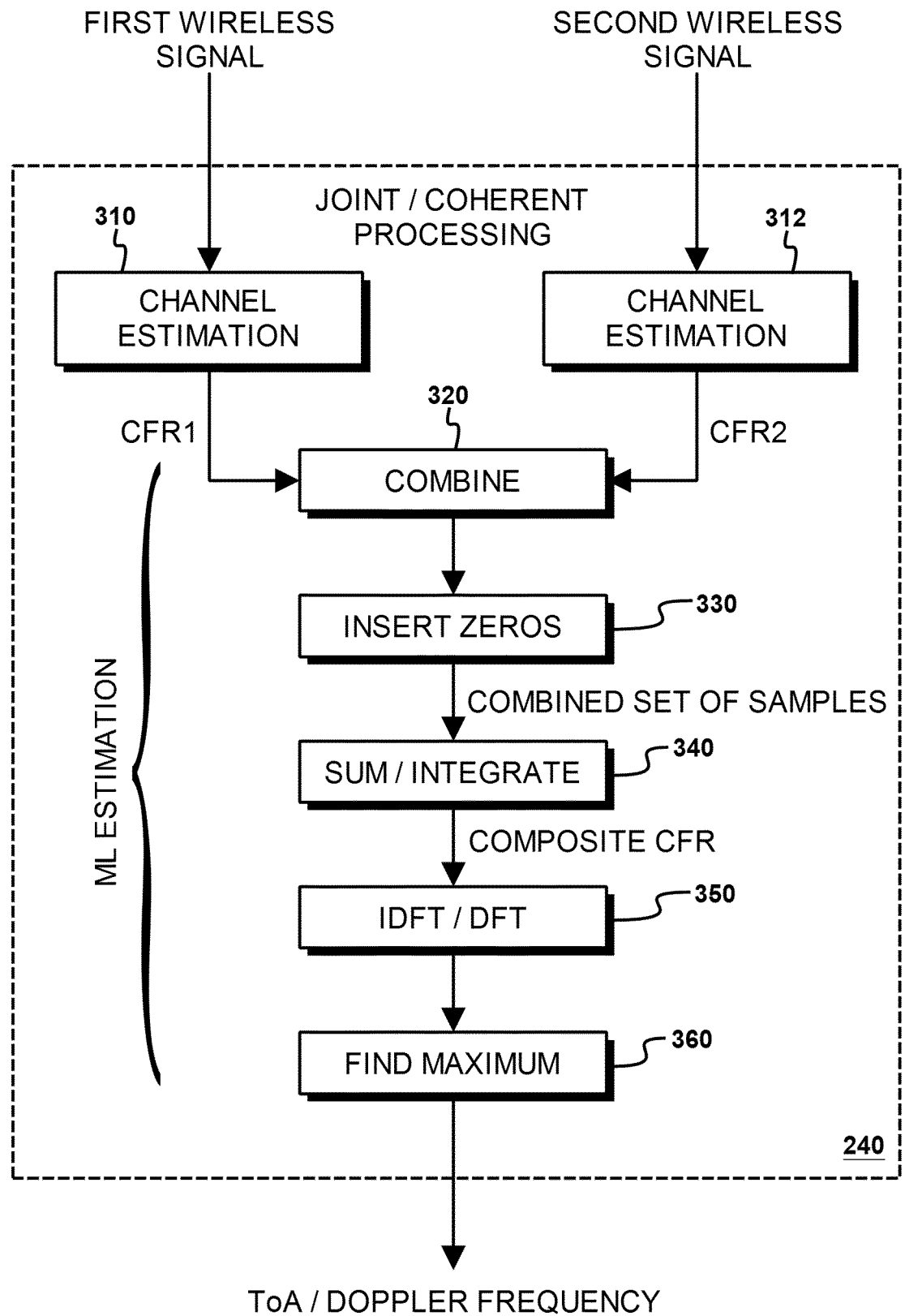
FIG. 15 is a flowchart illustrating the joint processing of wireless signals according to this embodiment.

FIG. 15 illustrates the joint processing 240 in greater detail, according to one embodiment. In this embodiment, the first and second wireless signals are combined and processed in the frequency domain. In step 310, the first wireless signal is processed to form a first channel frequency response CFR1. Similarly, the second wireless signal is processed, in step 312, to form a second channel frequency response CFR2. This can be done using any suitable channel estimation technique. Various channel estimation methods to derive a channel frequency response are known in the art.

In step 320, the two channel frequency responses CFR1 and CFR2, for the two time slots, are combined. The combination takes into account the difference in frequency between them. More specifically: the first channel frequency response CFR1 consists of a first set of samples and the second channel frequency response CFR2 consists of a second set of samples. The first and second sets of samples are partially overlapping in frequency. Therefore, they are non-uniformly sampled, with the first set including samples that do not exist in the second set, and vice versa. To create a uniformly sampled function, spanning the domain of both the first and second CFRs, zeros are inserted in the combined set of samples in step 330. This step is not essential, but it typically facilitates more efficient processing in the subsequent steps. The zeros may be inserted at frequencies that would have contained data signals, in the actual transmission by the transmitter 122*p*.

The result of steps 320 and 330 is a uniform combined set of samples in time-frequency space (comprising frequency samples for the different timeslots). In step 340, in a first example, this combined set of samples is integrated with respect to time, by summing along the time dimension. This produces a composite channel frequency response. As will be described in greater detail in the mathematical analysis below, this composite CFR can be processed to estimate one or more desired channel characteristics. In particular, to estimate the combined time of arrival (represented by the combined time delay of the channel), the composite CFR is processed in step 350 by applying an inverse discrete Fourier transform (IDFT). The time delay is the delay corresponding to the maximum value in the function output from the IDFT. This is identified in step 360.

Alternatively or in addition, it may be desirable to estimate the Doppler frequency of the channel. This can be done in a second example, by a slightly different series of steps. In step 340, the combined set of samples is integrated with respect to frequency, to produce the composite function (which in this case is a composite time domain function). The method then proceeds by performing a discrete Fourier transform (DFT) on the composite channel frequency response in step 350. The Doppler frequency is then the frequency corresponding to the maximum value in the function output from the DFT, which is found in step 360. Other channel characteristics may be estimated, as an alternative or in addition to the time delay and/or Doppler frequency. Further examples will become clear from the mathematical analysis below.

In a preferred embodiment, a plurality of channel characteristics may be estimated by alternate optimization—estimating each one in turn, while holding the others fixed. This process may be performed iteratively until convergence. It will be understood that steps 340, 350, and 360 may be executed in each iteration, to estimate the relevant parameter for that iteration.

Figure 12:
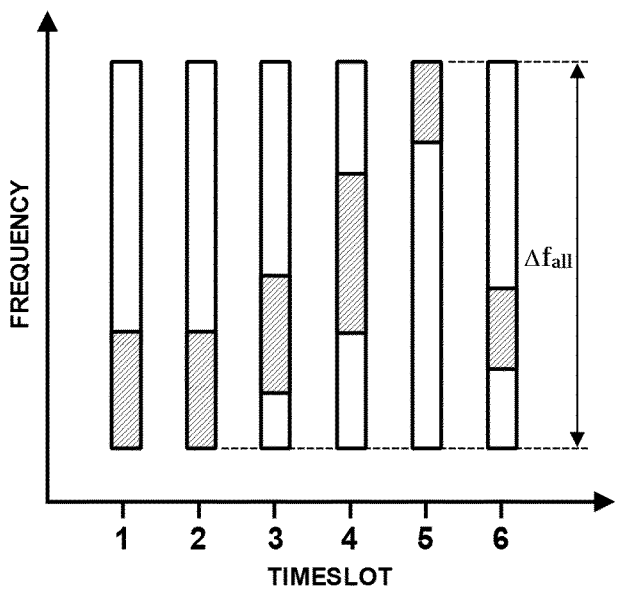
FIG. 12 illustrates graphically the process of inserting zeros internally in the CFRs for the different time slots, to generate a uniform data set.

The description of this embodiment has focused on the case of two wireless signals, for simplicity; however, it will be apparent that the method can be extended to any number of wireless signals transmitted by the transmitter 122*p* in any number of respective time slots (for example, as illustrated in FIGS. 1, 8, and 12).

In the embodiment described above, the processing to estimate the one or more channel characteristics was performed on board the UE A, by the processor 124*a*. However, this is not essential. In other embodiments, some or all of the joint processing of the first and second wireless signals may be performed by another device, such as positioning engine 130. In that case, the UE A may send the received wireless signals (or one of the intermediate processing results derived from those signals) to the positioning engine 130. The positioning engine may then complete the rest of the processing, to estimate the one or more channel characteristics.

If the UE A sends the wireless signals (or their derivatives) to the positioning engine 130, and the positioning engine 130 estimates the one or more channel characteristics, then the positioning engine 130 preferably also uses the one or more estimated channel characteristics in the calculation of a position or time.

On the other hand, in the case described above, in which the UE A estimates the one or more channel characteristics itself, the UE A may subsequently use the estimated characteristics in the calculation of a position or time. Alternatively or in addition, the UE A may send the estimated one or more channel characteristics to the positioning engine 130, for the positioning engine to use in the calculation of a position or time.

In the embodiment described above, the first wireless signal and the second wireless signal were processed to form respective first and second functions. The first and second functions were channel frequency responses. In other embodiments, the first and second wireless signals may be processed to form other functions, which need not be frequency domain functions. For example, the first function and the second function may be channel impulse responses.

It can be shown that the steps 310 to 360 in FIG. 15 provide a Maximum Likelihood (ML) estimate of the time of arrival and Doppler frequency, in the absence of multipath effects. Thus, embodiments of the invention estimate the one or more channel characteristics using ML estimation. In the present exemplary implementation, the Maximum Likelihood estimate is calculated by solving a nonlinear least squares problem. In particular, this can be done using the SAGE algorithm, as described above and as outlined in the mathematical analysis below. However, SAGE is just one suitable (albeit preferred) algorithm and the one or more channel characteristics could be estimated using any other suitable algorithm.

As mentioned above, it has been found to be convenient and efficient to insert zeros in the combined channel frequency response, so that it is uniformly samples, such that the DFT/IDFT can be performed by a fast algorithm, such as the Fast Fourier Transform (FFT) or Inverse Fast Fourier Transform (IFFT). However, this is also not essential. Other algorithms are available, including transforms for non-uniformly sampled data.

In the embodiments described above and illustrated with respect to FIG. 13, the transmitter 122$p$ of UE P is a single transmitter and the receiver 120$a$ of UE a is a single receiver. This will typically be the case—there will be a single transmitter and receiver, which are reconfigured in each time slot to transmit signals at different overlapping sets of frequencies. However, this is not essential. In some embodiments, there may be more than one transmitter or more than one receiver. One transmitter (receiver) may transmit (receive) at the first set of frequencies and the other transmitter (receiver) may transmit (receive) at the second set of frequencies.

Mathematical Treatment (Using the SAGE Algorithm)

To estimate the time of arrival of an incident signal with Channel Frequency Response $$H(t; f) = \sum_{l=1}^{L} H_l(t; f),$$

where l is the index of the multipath component, the SAGE algorithm relies on the iterative solution of the following least squares problem:

$$\Re\{\hat{\alpha}_{l,ML}\}, \Im\{\hat{\alpha}_{l,ML}\}, \hat{\tau}_{l,ML}, \hat{f}_{D,l,ML} = \underset{\Re\{\hat{\alpha}_l\},\Im\{\hat{\alpha}_l\},\hat{\tau}_l,\hat{f}_{D,l}}{\operatorname{argmin}} \left\{ \sum_{t_n} \sum_{f_k} \left| \hat{H}_l(t_n; f_k) - \alpha_l e^{j2\pi(f_{D,l}t_n - f_k\tau_l)} \right|^2 \right\}$$

where $\alpha_l$, $\tau_l$ and $f_{D,l}$ are the amplitude, the delay and the Doppler frequency, respectively, associated to the l-th multipath component; n and k are the time slot and sub-carrier indices, respectively and $\hat{H}_l(t_n; f_k)$ is an estimation of $H_l(t_n; f_k)$ determined in the "Expectation step" of SAGE. A precise mathematical formulation of SAGE with more details of the algorithm can be found in the following references: B. H. Fleury, M. Tschudin, R. Heddergott, D. Dahlhaus and K. I. Pedersen, "Channel parameter estimation in mobile radio environments using the SAGE algorithm," IEEE Journal on Selected Areas in Communications, vol. 17, no. 3, pp. 434-450, 1999; and C. C. Chong, D. I. Laurenson, C. M. Tan, S. McLaughlin, M. A. Beach and A. R. Nix, "Joint detection-estimation of directional channel parameters using the 2-D frequency domain SAGE algorithm with serial interference cancellation," in IEEE International Conference on Communications, 2002. Reference is also made to: Petre Stoica and Randolph Moses, "SPECTRAL ANALYSIS OF SIGNALS", PRENTICE HALL, Upper Saddle River, N.J. 2005. Here, we focus on the previous formula only and describe how it can be solved when $t_n$ and/or $f_k$ are not uniformly sampled.

The SAGE algorithm uses alternate optimization over the three variables $\alpha_l$, $\tau_l$ and $f_{D,l}$: starting from an initial guess on their values, it optimizes only one variable at a time, keeping the others fixed. The process is then repeated until convergence of all variables. We now discuss the alternate optimization of $\alpha_l$, $\tau_l$ and $f_{D,l}$. The one or more channel characteristics to be estimated may include any or all of these variables.

Optimization of $\alpha_l$

The value of $\alpha_l$ can be determined as the solution of a linear least squares problem, when the variables $\tau_l$ and $f_{D,l}$ have been specified. In particular, it can be shown that the minimizer of the least squares function is given by $$\alpha_{l,ML} = \frac{1}{N \times K} \sum_{t_n} \sum_{f_k} \left\{ \hat{H}_l(t_n; f_k) e^{-j2\pi(f_{D,l}t_n - f_k\tau_l)} \right\}$$

where N and K are the total number of time and frequency measurements, respectively.

Optimization of $\tau_l$

We can rewrite the argument of the least squares function in an easier form:

$$|\hat{H}_l(t_n;f_k) - \alpha_{l,ML}e^{j2\pi(f_{D,l}t_n - f_k\tau_l)}|^2 = |\hat{H}_l(t_n;f_k)|^2 + |\alpha_{l,ML}|^2 - 2\Re\{\hat{H}_l(t_n;f_k)\alpha_{l,ML}^* e^{-j2\pi(f_{D,l}t_n - f_k\tau_l)}\}$$

Note that we replaced $\alpha_l$ with its optimal version $\alpha_{l,ML}$ derived in the preceding section. Our goal is to solve the following problem (recalling that, in the following expressions, $f_{D,l}$ should be considered as a fixed and known quantity):

$$\hat{\tau}_{l,ML} = \underset{\tau_l}{\operatorname{argmin}} \left\{ \sum_{t_n} \sum_{f_k} \left\{ |\hat{H}_l(t_n; f_k)|^2 + |\alpha_{l,ML}|^2 - 2\Re\{\hat{H}_l(t_n; f_k)\alpha_{l,ML}^* e^{-j2\pi(f_{D,l}t_n - f_k\tau_l)}\} \right\} \right\}$$

The first term can be removed from the optimization as it does not depend on $\tau_l$, and we can use the expression for $\alpha_{l,ML}$ that was derived in the preceding section:

$$\hat{\tau}_{l,ML} = \underset{\tau_l}{\operatorname{argmin}}\{N \times K \times |\alpha_{l,ML}|^2 -$$

$$2R\left\{\sum_{t_n}\sum_{f_k}\left\{\hat{H}_l(t_n; f_k)\alpha^*_{l,ML}e^{-j2\pi(f_{D,l}t_n - f_k\tau_l)}\right\}\right\}$$

$$= \underset{\tau_l}{\operatorname{argmin}}\{N \times K \times |\alpha_{l,ML}|^2 - 2R\{N \times K \times \alpha^*_{ML}\alpha_{l,ML}\}\}$$

$$= \underset{\tau_l}{\operatorname{argmin}}\{N \times K \times |\alpha_{l,ML}|^2 - 2R\{N \times K \times |\alpha_{l,ML}|^2\}\}$$

$$= \underset{\tau_l}{\operatorname{argmin}}\{N \times K \times |\alpha_{l,ML}|^2 - N \times K \times 2|\alpha_{l,ML}|^2\}$$

$$= \underset{\tau_l}{\operatorname{argmin}}\{-N \times K \times |\alpha_{l,ML}|^2\}$$

$$= \underset{\tau_l}{\operatorname{argmin}}\{N \times K \times |\alpha_{l,ML}|^2\}$$

Therefore, the least squares solution adopted by SAGE to determine the delay coincides with the maximization of:

$$\hat{\tau}_{l,ML} = \underset{\tau_l}{\operatorname{argmin}}\left|\sum_{t_n}\sum_{f_k}\left\{\hat{H}_l(t_n; f_k)e^{-j2\pi(f_{D,l}t_n - f_k\tau_l)}\right\}\right|^2$$

We can sum over $t_n$, since we are not optimizing with respect to $f_{D,l}$, and obtain $$\hat{\tau}_{l,ML} = \underset{\tau_l}{\operatorname{argmin}}\left|\sum_{f_k}\left\{\sum_{t_n}\{\hat{H}_l(t_n; f_k)e^{-j2\pi f_{D,l}t_n}\}e^{j2\pi f_k\tau_l}\right\}\right|^2$$

And if we define $\hat{H}_l(f_k) \triangleq \sum_{t_n}\hat{H}_l(t_n; f_k)e^{-j\pi f_{D,l}t_n}$, we have:

$$\hat{\tau}_{l,ML} = \underset{\tau_l}{\operatorname{argmin}}\left|\sum_{f_k}\hat{H}_l(f_k)e^{j2\pi f_k\tau_l}\right|^2$$

Note that, if the frequency domain were uniformly sampled, then this expression would coincide with the IDFT of $\hat{H}_l(f_k)$. Nevertheless, in the more general, non-uniform case, the IDFT of $\hat{H}_l(f_k)$ is not defined. This issue can be solved by replacing $\hat{H}_l(f_k)$ with a uniformly sampled function, namely $\tilde{H}_l(k)$, which is equal to $\hat{H}_l(f_k)$, where this is defined, and to zero otherwise (as described already, above). Replacing $\hat{H}_l(f_k)$ with $\tilde{H}_l(k)$ does not alter the argument of the argmax function and allows us to use the IDFT to compute $\hat{\tau}_{l,ML}$:

$$\hat{\tau}_{l,ML} = \underset{\tau_l}{\operatorname{argmax}}\left|\sum_k IDFT\{\tilde{H}_l(k)\}\right|^2$$

As previously discussed, using the IDFT greatly reduces the computational effort, as it can be evaluated via the IFFT algorithm.

Optimization of $f_{D,l}$

The steps used in the previous section to optimize $\tau_l$ can be followed to determine the Doppler frequency of the l-th multipath component. In particular, it can be shown that the optimal $f_{D,l}$ is given by $$\hat{f}_{D,l,ML} = \underset{f_{D,l}}{\operatorname{argmax}}\left|\sum_{t_n}\hat{H}_l(t_N)e^{-j2\pi t_n f_{D,l}}\right|^2$$

with $\hat{H}_l(t_n) \triangleq \sum_{f_k}\hat{H}_l(t_n; f_k)e^{j2\pi\tau_l f_k}$. As in the preceding section, we can replace the non-uniform function $\hat{H}_l(t_n)$ with another function $\tilde{H}_l(n)$, which coincides with $\hat{H}_l(t_n)$, where defined, and is equal to zero otherwise. Finally, we have:

$$\hat{f}_{D,l,ML} = \underset{f_{D,l}}{\operatorname{argmax}}\left|\sum_n DFT\{\tilde{H}_l(n)\}\right|^2$$

which can be efficiently evaluated via the FFT algorithm.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of estimating one or more characteristics of a communications channel, the method comprising:
receiving a first wireless signal transmitted by a transmitter at a first set of frequencies in a first time slot;
receiving a second wireless signal transmitted by the transmitter at a second set of frequencies in a second time slot, wherein the second set of frequencies partially overlaps with the first set of frequencies and the second time slot is different from the first time slot; and
jointly processing the first wireless signal and the second wireless signal to estimate the one or more characteristics of the communications channel,
wherein the first wireless signal has a first center-frequency and the second wireless signal has a second center-frequency, and wherein jointly processing the first wireless signal and the second wireless signal is based on a difference between the second center-frequency and the first center-frequency.

2. The method of claim 1, wherein jointly processing the first wireless signal and the second wireless signal comprises:
combining the first wireless signal and the second wireless signal to form a composite function; and
processing the composite function to estimate the one or more characteristics of the communications channel.

3. The method of claim 2, wherein combining the first wireless signal and the second wireless signal to form a composite function comprises:
processing the first wireless signal to form a first function;
processing the second wireless signal to form a second function; and
combining the first function and the second function to produce the composite function.

4. The method of claim 3, wherein each of the first function and the second function comprises one of:
a channel impulse response; or
a channel frequency response.

5. The method of claim 3, wherein
the method further comprises:
taking into account the difference, when combining the first function and the second function.

6. The method of claim 4, wherein the first function is a first channel frequency response comprising a first set of samples and the second function is a second channel frequency response comprising a second set of samples,
wherein the first set of samples includes samples which do not exist in the second set of samples, and
the second set of samples includes samples which do not exist in the first set of samples,
wherein the method comprises combining the first set of samples and the second set of samples into a combined set of samples,
wherein, when combining the first set of samples and the second set of samples, zeros are inserted in the combined set of samples for samples that do not exist in the first set of samples and/or zeros are inserted in the combined set of samples for samples that do not exist in the second set of samples.

7. The method of claim 4, wherein the first function is a first channel frequency response, and the second function is a second channel frequency response, wherein processing the composite function comprises performing at least one of: a Discrete Fourier Transform or an Inverse Discrete Fourier Transform, on the composite function.

8. The method of claim 7, wherein performing at least one of: the Discrete Fourier Transform or the Inverse Discrete Fourier Transform, on the composite frequency response, comprises performing at least one of: a Fast Fourier Transform or an Inverse Fast Fourier Transform.

9. The method of claim 1, wherein jointly processing the first wireless signal and the second wireless signal to estimate the one or more characteristics of the communications channel comprises estimating the one or more characteristics according to a Maximum Likelihood criterion.

10. The method of claim 9, wherein estimating the one or more characteristics according to the Maximum Likelihood criterion comprises solving a Nonlinear Least Squares problem.

11. The method of claim 1, further comprising:
receiving assistance information relating to at least one of the first wireless signal and the second wireless signal; and
using the assistance information to assist in receiving said at least one wireless signal.

12. The method of claim 11, further comprising forwarding the assistance information to at least one other device, to assist said other device in receiving said at least one wireless signal.

13. The method of claim 11, wherein the assistance information comprises at least one of, or any combination of two or more of:
a type of at least one of the signals to be transmitted;
a time at which at least one of the signals will be transmitted;
a frequency at which at least one of the signals will be transmitted;
a bandwidth of at least one of the signals to be transmitted;
a power level with which at least one of the signals will be transmitted;
an antenna configuration that will be used to transmit at least one of the signals;
a time difference between the first wireless signal and the second wireless signal; and a phase relationship between the first wireless signal and the second wireless signal.

14. The method of claim 12, wherein the transmitter is a transmitter of a User Equipment (UE), in a wireless infrastructure network,
the first wireless signal and the second wireless signal are uplink signals,
the UE is controlled by a Base Station, hereinafter BS, in the wireless infrastructure network,
and wherein the method further comprises:
receiving a control signal transmitted by the BS for the UE; and
extracting at least some of the assistance information from the control signal.

15. The method of claim 1, wherein one or both of the first wireless signal and the second wireless signal is a synchronization signal.

16. The method of claim 1, wherein the one or more characteristics of the communications channel include at least one of, or any combination of two or more of:
a time delay of the channel;
a phase delay of the channel;
an amplitude response of the channel; and
a Doppler frequency.

17. A non-transitory computer readable storage medium storing computer program comprising computer program code configured to cause one or more physical computing devices to perform the steps of claim 1, if said computer program is run on said one or more physical computer devices.

18. An electronic communications device, comprising:
a first receiver, configured to receive a first wireless signal transmitted by a transmitter at a first set of frequencies in a first time slot;
a second receiver, configured to receive a second wireless signal transmitted by the transmitter at a second set of frequencies in a second time slot, wherein the second set of frequencies partially overlaps with the first set of frequencies and the second time slot is different from the first time slot; and
a processor, configured to jointly process the first wireless signal and the second wireless signal to estimate one or more characteristics of the communications channel,
wherein the first wireless signal has a first center-frequency and the second wireless signal has a second center-frequency, and wherein the processor is configured to jointly process the first wireless signal and the second wireless signal based on a difference between the second center-frequency and the first center-frequency.

19. The electronic communications device of claim 18, wherein the electronic communications device is configured to send the estimated one or more characteristics to a second device.

20. A transmitter device, configured to:
transmit a first wireless signal at a first set of frequencies in a first time slot;
transmit a second wireless signal at a second set of frequencies in a second time slot, wherein the second set of frequencies partially overlaps with the first set of frequencies and the second time slot is different from the first time slot,
wherein the first and second wireless signals are transmitted coherently,
wherein the first wireless signal has a first center-frequency and the second wireless signal has a second center-frequency, and wherein the first wireless signal and the second wireless signal are jointly processed based on a difference between the second center-frequency and the first center-frequency.

21. The transmitter device of claim 20, configured to provide, to at least one other device, assistance information relating to at least one of the first wireless signal and the second wireless signal, so as to assist a receiver in receiving said at least one wireless signal.

* * * * *